United States Patent [19]

Tsuboi et al.

[11] Patent Number: 5,124,788
[45] Date of Patent: Jun. 23, 1992

[54] DIGITAL COLOR COPYING MACHINE COMPRISING A TEST MODE FOR MAKING A COLOR ADJUSTMENT

[75] Inventors: Toshio Tsuboi; Shigeru Moriya; Keiji Nakatani, all of Osaka, Japan

[73] Assignee: Minolta Camera Kabushiki Kaisha, Osaka, Japan

[21] Appl. No.: 420,511

[22] Filed: Oct. 12, 1989

[30] Foreign Application Priority Data

Oct. 13, 1988 [JP] Japan ............................. 63-260327
Oct. 24, 1988 [JP] Japan ............................. 63-269212
Oct. 24, 1988 [JP] Japan ............................. 63-269213

[51] Int. Cl.$^5$ .......................... H04N 1/00; H04N 1/46
[52] U.S. Cl. ...................................... 358/80; 358/75; 358/406
[58] Field of Search .................. 358/75, 75 IJ, 76, 77, 358/78, 80, 406, 443, 448, 450, 451, 452, 453, 401

[56] References Cited

U.S. PATENT DOCUMENTS

| | | | |
|---|---|---|---|
| 4,755,852 | 7/1988 | Fujita | 355/14 E |
| 4,875,173 | 10/1989 | Nakajima | 364/518 |
| 4,888,636 | 12/1989 | Abe | 358/80 |
| 4,910,589 | 3/1990 | Nagano et al. | 358/75 |
| 4,954,889 | 9/1990 | Endo | 358/75 |
| 4,958,221 | 9/1990 | Tsuboi et al. | 358/80 |
| 4,959,712 | 9/1990 | Tsuzuki et al. | 358/75 |
| 4,978,226 | 12/1990 | Moriya et al. | 358/75 |

FOREIGN PATENT DOCUMENTS 49-131317 12/1974 Japan .
63-14177 1/1988 Japan .
1-126074 5/1989 Japan .

Primary Examiner—Edward L. Coles, Sr.
Assistant Examiner—Thomas D. Lee
Attorney, Agent, or Firm—Burns, Doane, Swecker & Mathis

[57] ABSTRACT

A digital color copying machine comprising a test mode is disclosed. In the test mode, image data corresponding to a partial area of an original document indicated is stored in a RAM, and thereafter, the image data stored in the RAM is read out repeatedly, and plural test images for which the color correction is made with different color tones respectively are formed as a mosaic monitor image on a recording medium. Then, one of plural test images is selected, and a copy of document having a color tone of the selected test image is produced. The test mode is canceled if a test image has not been selected during a predetermined time period.

31 Claims, 15 Drawing Sheets

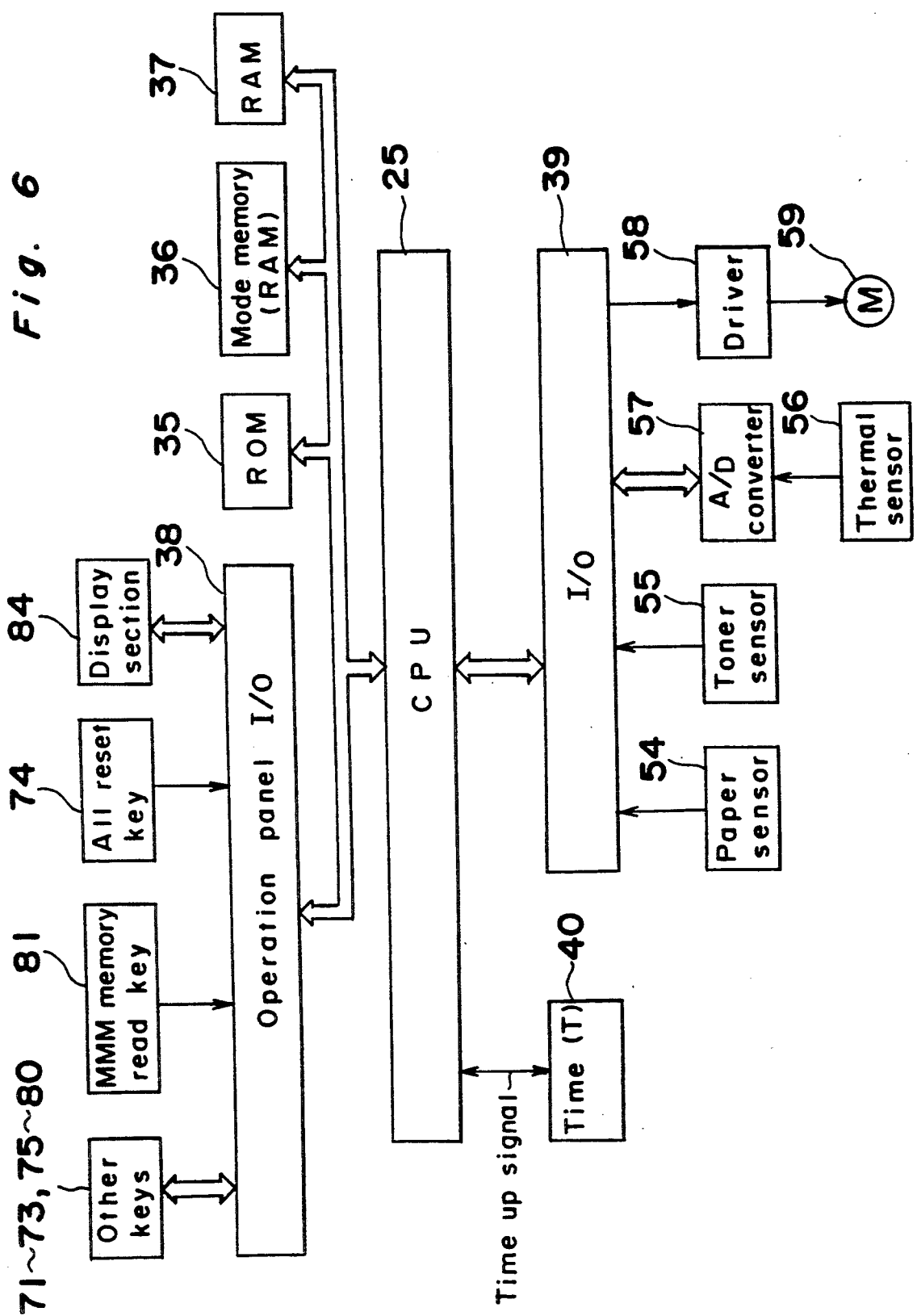

DIGITAL COLOR COPYING MACHINE COMPRISING A TEST MODE FOR MAKING A COLOR ADJUSTMENT

BACKGROUND OF THE INVENTION

1. Field of the Invention

The present invention relates to a digital color copying machine, and more particularly, to a digital color copying machine capable of performing a test mode for making a color adjustment.

2. Description of the Related Art

A conventional digital color copying machine comprises a reading section for reading an image of a document by using a color image sensor and converting the image of the document into image data for printing, and an electrophotographic printer section for printing an image of the document on a copying paper according to the image data. In cases where that plural color images are to be superimposed on a copying paper, the document is read out repeatedly by the reading section, and each color image is printed on the same copying paper by the printer section in the order of respective colors predetermined.

The reading section comprises a masking circuit for generating a color-corrected signal corresponding to printing characteristics of the printer section. Generally speaking, it is difficult for the masking process circuit to minimize the color difference between the real document and the copy thereof with respect to all the colors contained therein. Therefore, in a case where a copy is further copied as a document, the color tone of the secondary copy may be considerably different from that of the original document. However, in the range of a limited color tone, if a better color balance adjustment is performed, the variation of the color tone can be minimized.

Conventionally, the color balance adjustment is performed by referring to a copy obtained in a certain color balance in a manner of so-called cut and try. In this case, the scanning operation of the document is repeated a number of times equal to the product of the number of times of the color balance operation needed for obtaining a desired color copy and the number of the printing colors, and therefore, the color balance operation is time consuming and laborious.

The inventors of the present invention have proposed a color adjustment selecting method (referred to as a mosaic monitor method hereinafter) for decreasing time and cost required for the color correction in the U.S. patent application Ser. No. 321,405. In this mosaic monitor method, a part of a document (referred to as a specific area hereinafter) including a partial image, for example, the face of a person, for which the operator makes the color reproduction very particularly, is set by a specific area setting means and then, image data of the specific area is stored in an image memory means. Next, the color adjustment is made for the image data read out from the image memory means with predetermined various color correction levels, and then, those image data are printed at different positions of the same copying paper in a mosaic-like pattern. Thereafter, the operator selects an image having a color balance nearest to that of the document or an image having a color balance desirable for the operator among plural images of the specific area (referred to as mosaic monitor images hereinafter) which have been reproduced with different color balances, respectively. Thereafter, a copy of the whole area of document is produced based on the color correction level of the mosaic monitor image selected. Thus, a copy of document having a desirable color tone can be obtained easily.

However, in the digital color copying machine of this type, in the case of determining an image having the most desirable color tone among the mosaic monitor images, the operator often wavers in the determination thereof, therefore, it may take a long time to determine an image having the most desirable color tone. In this case, if another operator wishes to produce a copy of another document, the mosaic monitor mode must be cleared so that the program flow returns to the normal copying operation mode. Thereafter, when the operator wishes to perform the mosaic monitor mode so as to select an image having a desirable color tone, the operator must newly set various kinds of setting conditions such as the area setting for setting a specific area on the document again, resulting in inconvenience to the operator who performs the mosaic monitor mode.

In order to avoid the above inconvenience, if the normal copying operation is inhibited for the other operators until an image having a desirable color tone is selected, the inconvenience is caused to the other operators since they can perform the normal copying operation.

SUMMARY OF THE INVENTION

An essential object of the present invention is to provide a digital color copying machine comprising a test mode for making a color adjustment which is capable of performing a normal copying operation if an image having a desirable color tone has not been selected during a predetermined time period.

Another object of the present invention is to provide a digital color copying machine comprising a test mode for making a color adjustment which is capable of performing the test mode without setting copying conditions even after clearing the test mode.

A further object of the present invention is to provide a digital color copying machine comprising a test mode for making a color adjustment which is capable of inhibiting the selection of the test mode after copying conditions have been stored in a memory so as to prevent the copying conditions from being replaced by other copying conditions.

A still further object of the present invention is to provide a digital color copying machine comprising a test mode for making a color adjustment which is capable of clearing copying conditions stored in a memory when the clearing operation of the copying conditions is instructed in the case where an image having a desirable color tone is not selected.

In order to accomplish the above objects, according to one aspect of the present invention, a digital color copying machine is provided comprising: image reading means for scanning an original document image and generating image data; color correcting means for making a color correction for said image data with a color tone; image forming means for forming the original document image on a recording medium in response to the image data color-corrected by said color correcting means; mode selecting means for selecting a test mode; area indicating means for indicating a partial area of the original document image; memory means for storing a collection of the image data corresponding to the partial area indicated by said area indicating means; test image signal generating means for reading out said collection of the image data stored in said memory means and applying it to said color correcting means repeatedly and respectively making the color correction with different color tones for plural collections of the image data applied repeatedly, thereby generating plural a test image signal when the test mode is selected by said mode selecting means; first control means for controlling the drive of said image forming means according to the test image signal generated by said test image signal generating means and forming plural test images of the indicated partial area for which the color correction is made with different color tones respectively on a recording medium; image selecting means for selecting any one of plural test images formed by said first control means; second control means for controlling said color correcting means so as to make the color correction for the entire original document image with a color tone with which the color correction is made for one of plural test image selected by said image selecting means, and producing a copy of the entire original document image; and canceling means for canceling the test mode selected by said mode selecting means if one of the plural test images has not been selected selecting means during a predetermined time period since plural test images are formed by said first control means.

According to another aspect of the present invention, a digital color copying machine is provided comprising: image reading means for scanning an original document image and generating image data; color correcting means for making the color correction for said image data generated by said image reading means; image forming means for forming the original document image on a recording medium in response to the image data generated by said color correcting means; mode selecting means for selecting a test mode; area indicating means for indicating any part of the original document image; memory means for selectively storing image data corresponding to the part indicated by said area indicating means from the image data generated by said image reading means; test image signal generating means for reading out the image data stored in said memory means and applying it to said color correcting means repeatedly and making the color correction with different color tones for the image data applied repeatedly, thereby generating a test image signal when the test mode is selected by said mode selecting means; first control means for controlling the drive of said image forming means according to the test image signal generated by said test image generating means and forming plural test images on a recording medium; image selecting means for selecting any one of plural test images; second control means for controlling said color correcting means so as to make the color correction for the entire original document image with a color tone with which the color correction is made for one of plural test images selected by said image selecting means, and producing a copy of the entire original document image having the selected color tone; storing means for storing copying conditions to be used in the test mode and canceling the test mode selected by the mode selecting means so as to defer the selection of the image selecting means if one of plural test images has not been selected by said image selecting means during a predetermined time period since plural test images are formed by said first control means; and restoring means for restoring said copying conditions stored by said storing means so as to enable said image selecting means to select any one of plural test images.

According to a further aspect of the present invention, a digital color copying machine is provided which further comprises inhibiting means for inhibiting the selection of said mode selecting means after said storing means has stored said copying conditions.

According to a still further aspect of the present invention, a digital color copying machine is provided which further comprises instruction inputting means for inputting an instruction for clearing said copying conditions stored by said storing means; and clearing means for clearing said copying conditions stored by said storing means when the instruction is input by said instruction inputting means.

BRIEF DESCRIPTION OF THE DRAWING

These and other objects and features of the present invention will become clear from the following description taken in conjunction with the preferred embodiment thereof with reference to the accompanying drawings, in which:

FIG. 6 is a schematic block diagram of a CPU and peripheral input and output units in the digital color copying machine shown in FIG. 1;

DETAILED DESCRIPTION OF THE PREFERRED EMBODIMENT

Figure 1:
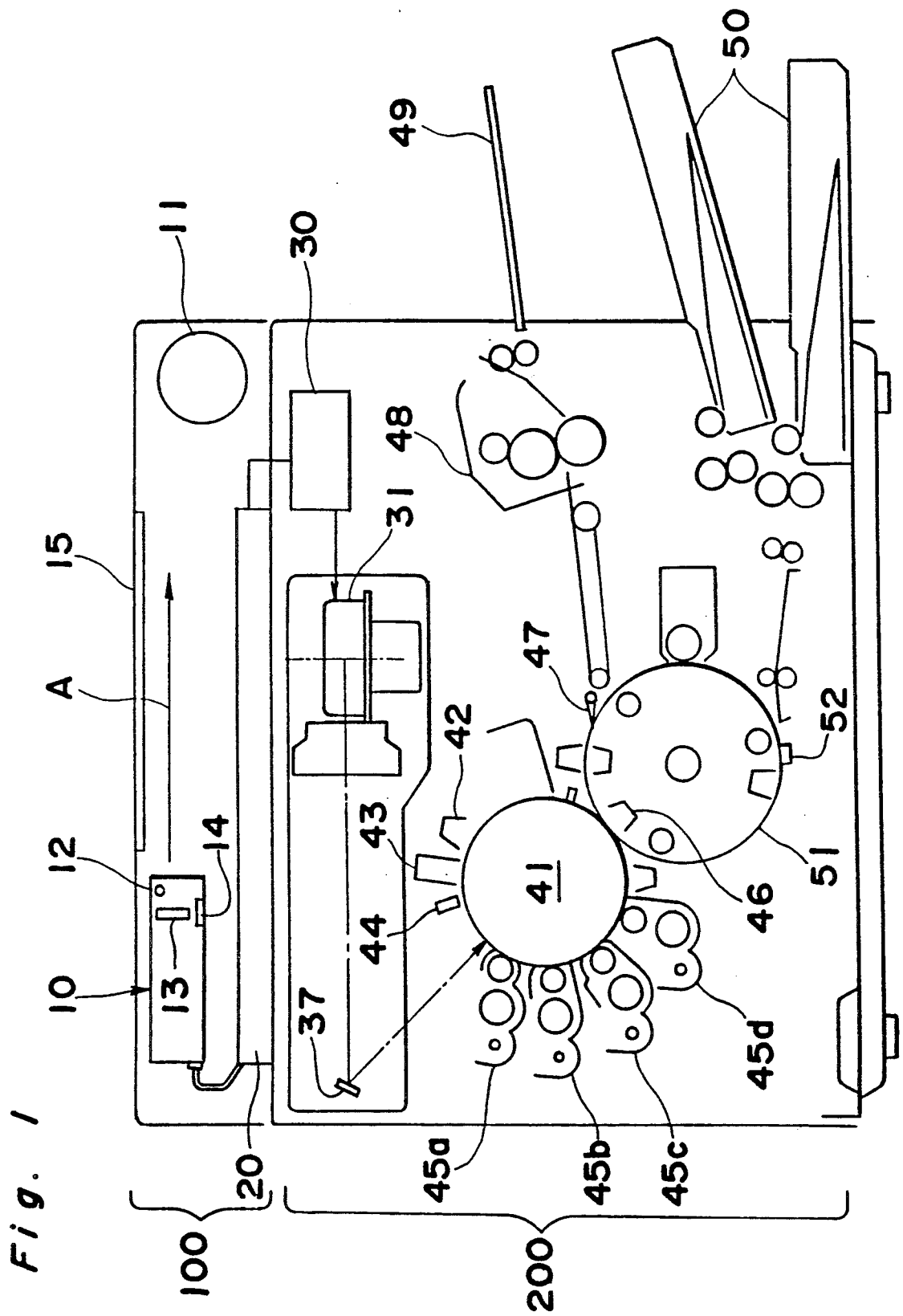
FIG. 1 is a schematic longitudinal cross sectional view of a digital color copying machine of a preferred embodiment according to the present invention.

A digital color copying machine of a preferred embodiment according to the present invention will be described below in the order of the following items, with reference to the attached drawings.

(1) Composition of the digital color copying machine (2) Action of mosaic monitor and color correction adjustment function (3) Color tone setting circuit (4) Image memory circuit (5) Storing mode setting values to be set in the mosaic monitor mode and selecting an image having a desirable color balance (6) Control flow in the mosaic monitor mode The present invention particularly relates to the description of the above paragraph (5).

(1) Composition of the digital color copying machine

A digital color copying machine of the preferred embodiment according to the present invention comprises a reading section 100 for reading an image of a document using an image sensor and converting the image of the document into image data, and a printer section 200 for printing the image corresponding to the image data on a copying paper using the electrophotographic process.

In the copy machine, a multi-color copy is obtained by repeating an image reading process by the image reading section 100 and an image forming process by the printer section 200 with respect to each of the printing colors. That is, the reading section 100 reads the image of the document corresponding to respective colors of yellow, magenta and cyan, respectively, and outputs respective color image data to the printer section 200. The printer section 200 forms respective color images according to respective color image data outputted from the reading section 100. Thus, respective color images are superimposed on a copying paper so as to form a color image.

FIG. 1 shows the whole composition of the digital color copying machine of the preferred embodiment according to the present invention.

Referring to FIG. 1, a scanner 10 comprises an exposure lamp 12 for illuminating the document, a rod lens array 13 for condensing the light reflected from the document, and a CCD color image sensor 14 for converting the condensed light into an electrical signal. The scanner 10 is moved in a direction indicated by an arrow A by a motor 11 upon reading the document so as to scan the document set on a platen 15. The image of the document illuminated by a light source is converted into multi-level analogue electric signals of red color, green color and blue color by the CCD color image sensor 14.

The analogue electric signals outputted from the CCD color image sensor 14 are converted into binary image data corresponding to each of a red color image, a green color image and a blue color image of the document, and individual color image data are stored in a buffer memory 30.

Figure 2:
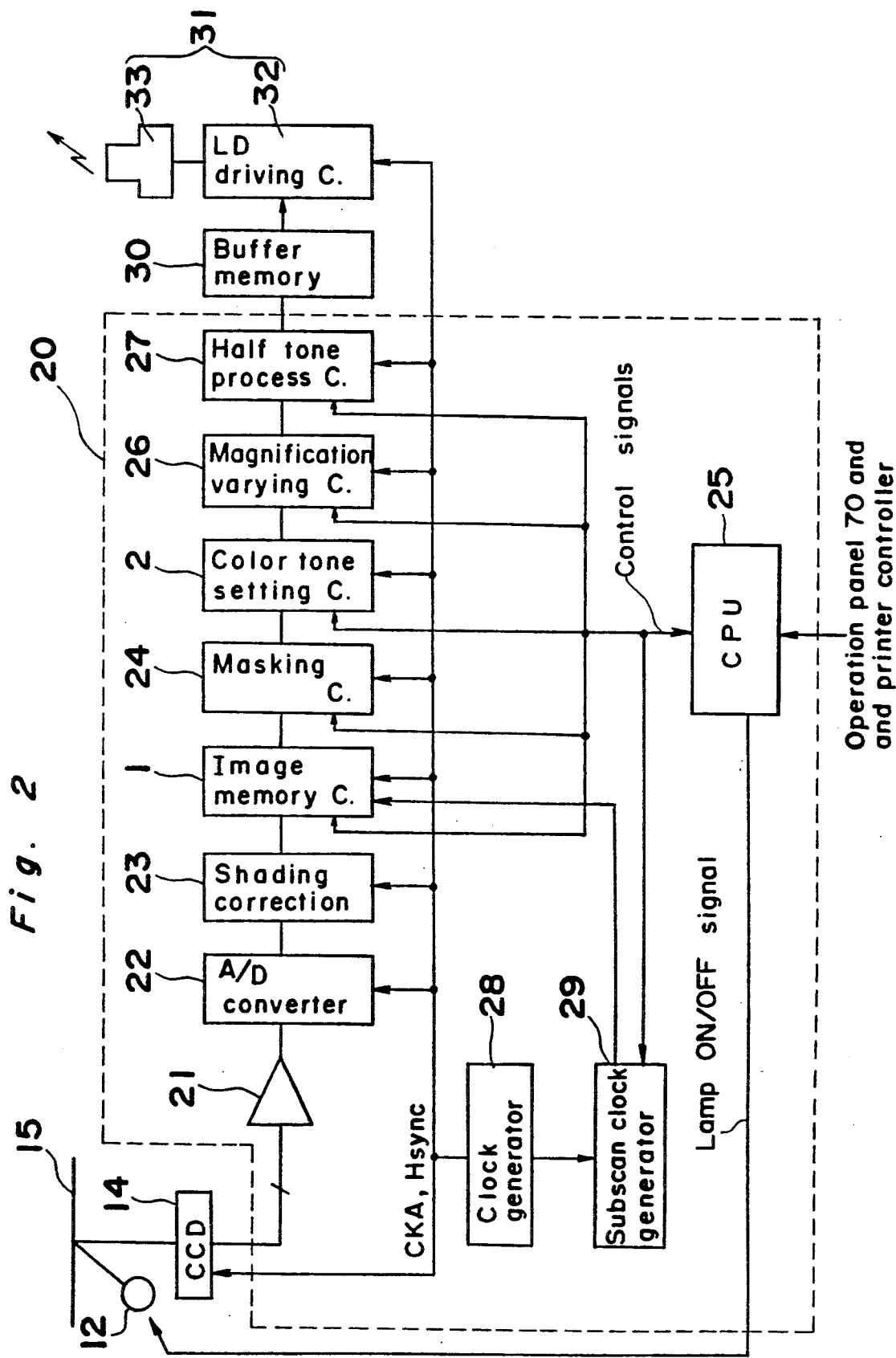
FIG. 2 is a schematic block diagram of a signal processing section shown in FIG. 1.

Referring to FIG. 2, a print head 31 comprises an LD driving circuit 32 and a semiconductor laser (LD) 33. The LD driving circuit 32 drives the semiconductor laser 33 according to the image data read out from the buffer memory 30.

Referring back to FIG. 1, a laser beam generated from the semiconductor laser 33 is swept in the axial direction of a photoconductive drum 41 by an optical means (not shown) such as a polygon mirror, and is projected onto the surface of the rotating photoconductive drum 41 through a reflection mirror 37. Then, the image of the document is formed on the surface of the photoconductive drum 41. Before the photoconductive drum 41 is projected by the above laser beam, it is illuminated by an eraser lamp 42, is electrified by a corona charger 43, and furthermore, is illuminated by an eraser lamp 44. Thereafter, the above laser beam is projected onto the surface of the photoconductive drum 41 so as to form an electrostatic latent image thereon. After either one of an yellow color toner developing unit 45a, a magenta color toner developing unit 45b, a cyan color toner developing unit 45c and a black color toner developing unit 45d is activated, the electrostatic latent image formed on the surface of the photoconductive drum 41 is developed into a visible toner image. The developed visible toner image is transferred onto a copying paper which is wound around a transfer drum 51.

The image forming process is repeated with respect to four colors (yellow, magenta, cyan and black) so as to form a color image on a copying paper wound around the transfer drum 51. The scanner 10 is driven in synchronism with the rotations of the photoconductive drum 41 and the transfer drum 51 in the image forming process. Thereafter, a separating nail member 47 is enabled so that the copying paper is separated from the transfer drum 41, and thereafter, the copying paper is fixed by a fixing unit 48 and is discharged to a paper discharging tray 49.

It is to be noted that the copying paper is fed from a paper cassette 50, and the edge of the copying paper is chucked by a chucking mechanism 52 which is arranged around the transfer drum 51 so as to prevent an image from being shifted upon transferring the toner image thereon.

FIG. 2 shows a signal processing section 20 for processing the analogue electric signals outputted from the CCD color image sensor 14 so as to output the binary image signals corresponding to the electric signals.

Referring to FIG. 2, in the normal image forming process, the analogue image signals outputted from the CCD color image sensor 14 are converted into electric signals corresponding to the density of the image by a logarithmic amplifier 21, and the electric signal outputted from the amplifier 21 is converted into multi-level digital data by an analogue to digital converter (referred to as an A/D converter hereinafter) 22. A shading correction is performed with respect to individual image data of red color, green color and blue color by a shading correction circuit 23. In a mosaic monitor mode (MMM) as described later, the image data outputted from the shading correction circuit 23 is stored in an image memory circuit 1. On the other hand, in a normal print mode for forming a normal color image on a copying paper, the image memory circuit 1 is disabled, and the image data outputted from the shading correction circuit 23 is directly to a masking circuit 24.

Respective image data of red color, green color and blue color are processed in parallel in the above data processing. Thereafter, the masking circuit 24 generates image data of one printing color of yellow color, magenta color, cyan color and black color from the image data of red color, green color and blue color according to the characteristics of the printing toner designated, wherein the printing color is determined in response to a control signal input from a CPU 25.

The masking circuit 24 comprises a back ground color rejecting circuit for rejecting color data on a back ground surface of the image to be processed, and a black color data generating circuit for generating black color data upon scanning black color image.

In the case that the color balance is to be altered in the mosaic monitor mode and the normal print mode, the color tone setting circuit 2 performs the color correction for the image data outputted from the masking circuit 24, and outputs the corrected image data to a magnification varying circuit 26. On the other hand, in the case that the color balance is kept unchanged, the color tone setting circuit 2 is disabled, and therefore, the color correction is not performed. Then, the image data outputted from the masking circuit 24 is directly sent to the magnification varying circuit 26.

The magnification varying circuit 26 electrically processes the image data outputted from the masking circuit 24 or the color tone setting circuit 2 so as to vary the magnification of the image in the main scan direction by a well known manner, and output the generated image data to a half tone processing circuit 27. On the other hand, the magnification in the subscan direction is varied by varying the velocity of the scanner 10 for scanning the document.

The half tone processing circuit 27 binarizes the image data outputted from the magnification varying circuit 26 so as to generate the binary pseudo half tone signals and store them in the buffer memory 30. The LD driving circuit 32 drives the semiconductor laser 33 so as to generate a laser beam according to the pseudo half tone signals outputted from the buffer memory 30.

On the other hand, a clock generator 28 generates a horizontal synchronizing signal Hsync and a clock signal CKA for synchronizing the reading action of the CCD color image sensor 14 with the image data processing of respective circuits of the signal processing section 20. Furthermore, a subscan clock generator 29 for varying the magnification generates a subscan clock for varying the magnification which is an interruption signal for outputting to the image memory circuit 1 in accordance with a control signal outputted from the CPU 25.

The composition of the CPU 25 and the peripheral input and output units will be described later with reference to FIG. 6.

Figures 3, 4:
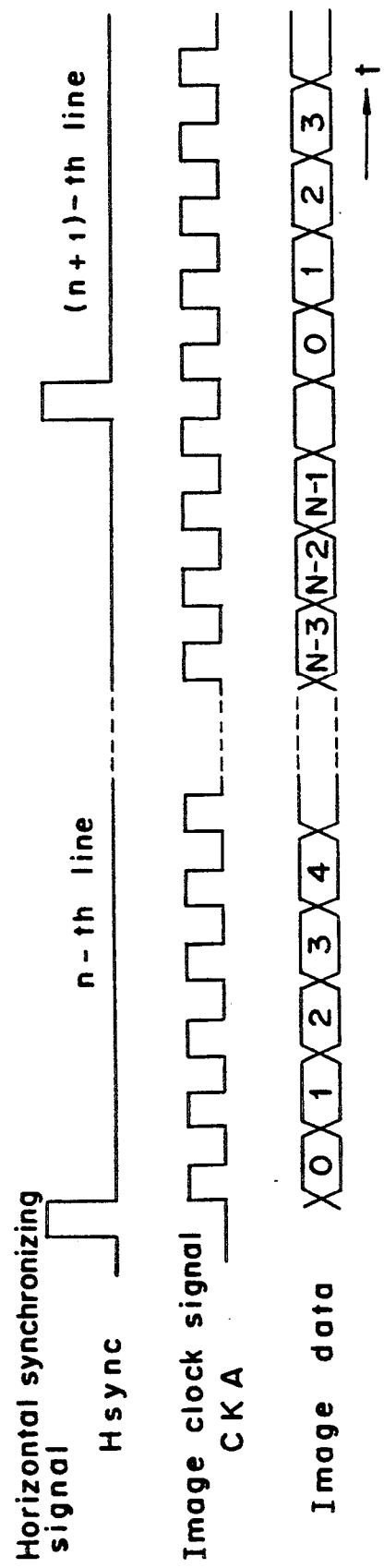
FIG. 3 is a timing chart showing an action of the signal processing section shown in FIG. 2.
FIG. 4 is a top plan view of an operation panel of the digital color copying machine shown in FIG. 1.

FIG. 3 shows a timing chart of the image data which is processed in the signal processing section 20.

Referring to FIG. 3, the horizontal synchronizing signal Hsync and the clock signal CKA are generated by the clock generator 28, and the CCD color image sensor 14 outputs the image data of red color, green color and blue color in serial in synchronism with the clock signal CKA. In FIG. 3, the numerals indicated in the individual image data denote addresses in the main scan direction. Every time the horizontal synchronizing signal Hsync is generated, the line n in the main scan direction is renewed. Then, the scanner 10 is moved in the subscan direction by a unit distance.

The digital color copying machine of the present preferred embodiment comprises a color correction function which is performed in the mosaic monitor mode, and a superimposing function for superimposing one image on another image. In order to perform the above functions, a memory for storing image data is required. Since there are a number of image processing common to both the above functions, both of the image memory circuit 1 for storing image data and the color tone setting circuit 2 are used and are controlled by the CPU 25 upon performing the above functions. It is to be noted that the detailed description of the superimposing function is omitted therein since the superimposing function is disclosed in the other U.S. applications applied by the present applicant and is well known to those skilled in the art.

FIG. 4 shows an operation panel 70 arranged on the main body of the copying machine.

Referring to FIG. 4, on the operation panel 70, there are arranged a print start key 71 for starting the copying operation, an interruption key 72 for instructing an interruption copying operation, a clear stop key 73, an all reset key 74, a set of ten keys 75, a set key 76, a cancel key 77, various kinds of function keys 78 to 81, jog dials 82 and 83 for setting the areas which are described later, a liquid crystal display section 84 for displaying the image of the document so as to set the above areas and displaying various kinds of messages. The function keys 78, 79, 80 and 81 are selecting keys for selecting the mosaic monitor mode and a superimposing mode, a density correction key, and a mosaic monitor mode memory read key, respectively. It is to be noted that the all reset key 74 is also used for clearing data stored in a mode memory 36.

Figure 5:
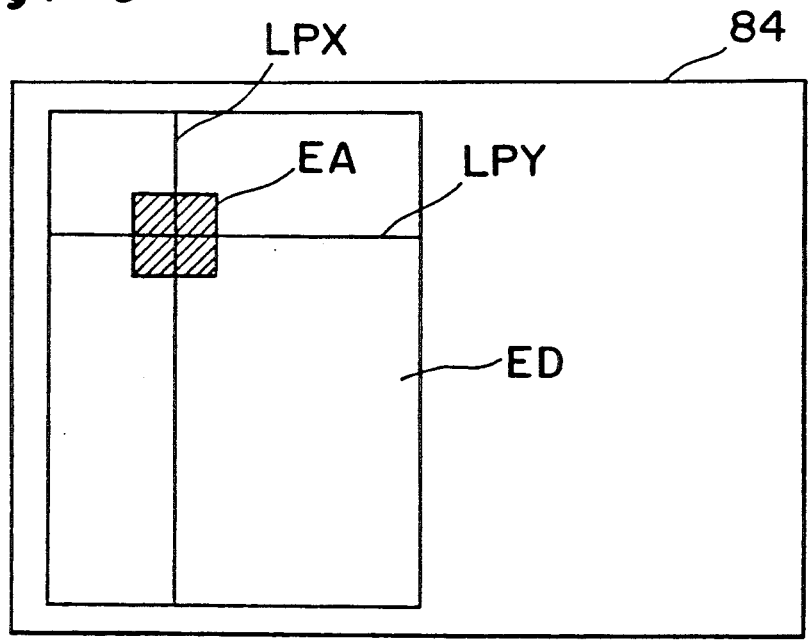
FIG. 5 is a front view of a display section of the operation panel shown in FIG. 4 upon setting a specific area thereon.

In the mosaic monitor mode described later in detail, the areas such as specific area etc. are set as follows. For example, in the case of setting the specific area, as shown in FIG. 5, a document is set on the platen 15, and a preparatory scan is performed by the scanner 10, and then, the image of the document is roughly displayed on the document area ED of the display section 84 of the operation panel 70. As shown in FIG. 5, the intersection between a longitudinal instructing line LPX and a lateral instructing line LPY corresponds to the center of the square specific area EA. When the jog dials 82 and 83 are rotated, the instructing lines LPX and LPY are moved in the longitudinal direction and the lateral direction, respectively. Therefore, the specific area EA is set by rotating the jog dials 82 and 83, and the set key 76 is pushed down, so that the specific area is set.

The CPU 25 controls not only the action of the image processing section 20 but also the action of the operation panel 70 and the printing operation, as shown in FIG. 6. The CPU 25 is connected to a ROM 35, a mode memory 36 of a RAM, a RAM 37 used as a working area for the CPU 25 and an operation panel input and output port circuit 38.

The mode memory 36 stores data to be processed in the mosaic monitor mode upon automatically clearing the mosaic monitor mode, as described in detail later. Further, the operation panel input and output port circuit 38 is connected to various kinds of keys 71 to 83 of the operation panel 70 and the display section 84 thereof. Furthermore, the CPU 25 receives a time up signal outputted from a timer (T) 40 when the timer (T) 40 counts a predetermined time as described in detail later.

The CPU 25 is connected to a paper sensor 54 and a toner sensor 55 which are used for controlling the copying operation through an input and output port circuit 39, and a thermal sensor 56 for measuring the temperature within the copying machine through the input and output port circuit 39 and an analogue to digital converter 57. Furthermore, the CPU 25 drives a motor 59 used for the copying operation through a driver 58.

(2) Action of mosaic monitor and color correction adjustment function

The mosaic monitor is performed by the image memory circuit 1 for storing the image data of the specific area EA and the color tone setting circuit 2 for performing the color correction in a printing process.

The mosaic monitor mode is selected when the function key 78 of the operation panel 70 is pushed down. The mosaic monitor is to make various color corrections for the image of the specific area EA set by the operator and print images of the specific area EA having different color balances (referred to as mosaic monitor images hereinafter) on the same copying paper.

Therefore, an image having a desirable color balance can be selected by observing the mosaic monitor images. That is, when the operator selects an image having a desirable color balance among the mosaic monitor images by operating a key on the operation panel 70, the color adjustment coefficients for the color adjustment of the selected image are automatically set, and thereafter, the printing operation is performed by using the selected color adjustment coefficients.

In the mosaic monitor mode, first of all, a specific area EA for which the color adjustment is made (for example, an area indicated by oblique lines) is set with looking at the image of the document displayed on the display section 84 of the operation panel 70 which has been obtained in the above preparatory scan process. When the specific area EA is set, the image memory circuit 1 stores only image data I corresponding to the specific area EA in a RAM 401 shown in FIG. 10. It is to be noted that the upper limit of the size of the specific area EA is predetermined according to the memory capacity of the RAM 401.

Thereafter, the color tone setting circuit 2 performs various kinds of color correction for the image data I which is outputted from the image memory circuit 1 and is converted into the image data of printing color so as to generate printing image data $I' = kI$ ($k = Ky$, $Km$, $Kc$), wherein the coefficients $Ky$, $Km$ and $Kc$ are the color adjustment coefficients k for yellow color, magenta color and cyan color, respectively.

Figure 7:
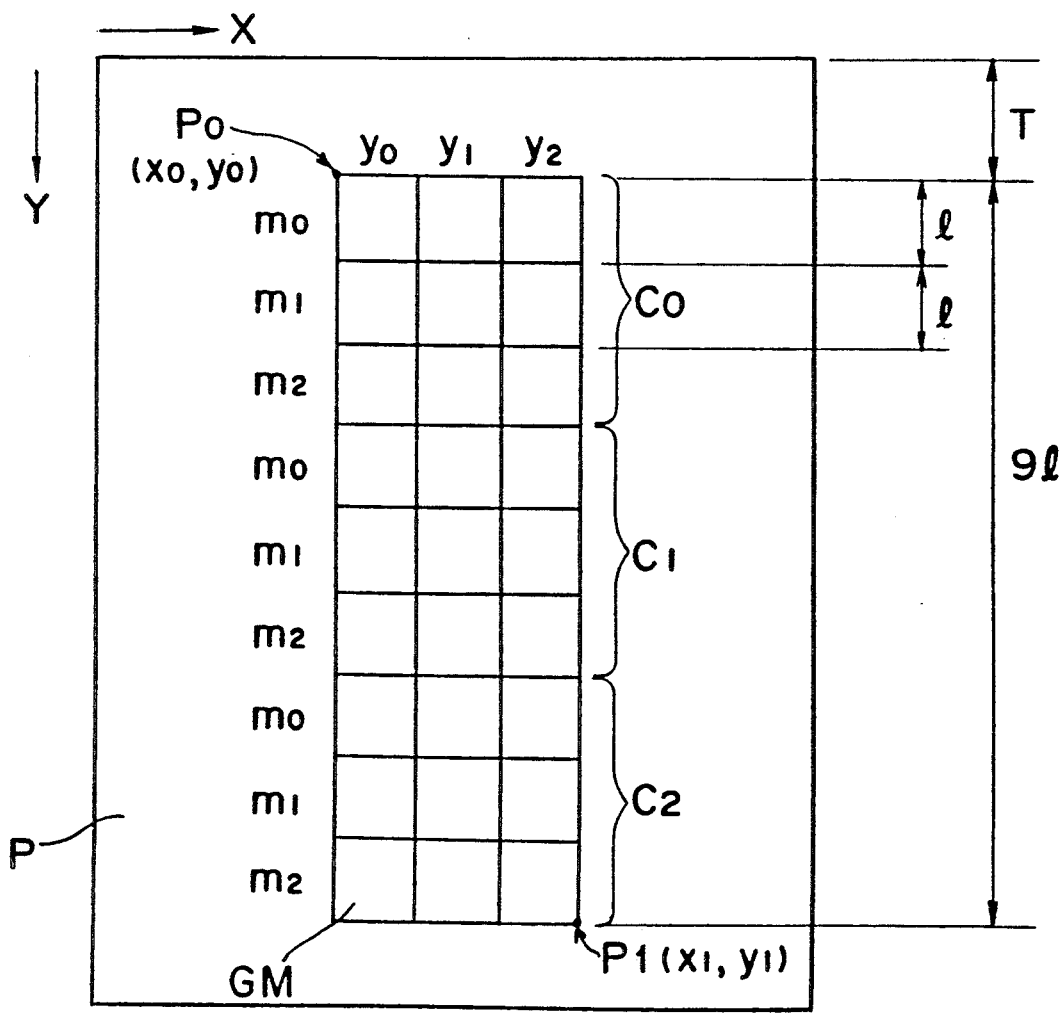
FIG. 7 is a front view of an output format of a mosaic monitor image displayed on the display selection shown in FIG. 4.

FIG. 7 shows one example of the output format of the printing image data $I'$.

Referring to FIG. 7, three kinds of color adjustment coefficient $Ky = y_i$, $Km = m_i$ and $Kc = c_i$ ($i = 0, 1, 2$) are used for three colors of cyan color (c), yellow magenta color (m) and yellow color (y), and then, 27 kinds of images ($3 \times 3 \times 3 = 27$) are outputted. The color adjustment coefficients $c_1$, $m_1$ and $y_1$ represent standard values of cyan, magenta and yellow colors, respectively, the color adjustment coefficients $c_0$, $m_0$ and $y_0$ represent values each of which is a product of the standard value and a predetermined factor smaller than one, and the color adjustment coefficients $c_2$, $m_2$ and $y_2$ represent values of cyan, magenta and yellow colors, each of which is a product of the standard value and another predetermined factor larger than one.

The operator selects a suitable color tone among the 27 kinds of mosaic monitor image GM shown in FIG. 7, and then, the process of the mosaic monitor mode is completed.

In the case where the operator specifies a desirable color tone from the mosaic monitor image GM, for example, the function keys 78 to 81 are operated according to a message displayed on the display section 84 of the operation panel 70 so as to select one image from the mosaic images GM, and thereafter, the color balance for processing an image is specified. Otherwise, after making the image block shown in FIG. 7 display on the display section 84, the function keys 78 to 81 and the ten key 75 may be operated so as to select one of the mosaic images GM, and then, a desirable color balance may be selected.

Next, the image of the document is read out again by the reading section 100, and then, the image having the set color tone is printed by the printer section 200.

(3) Color tone setting circuit

Figure 8:
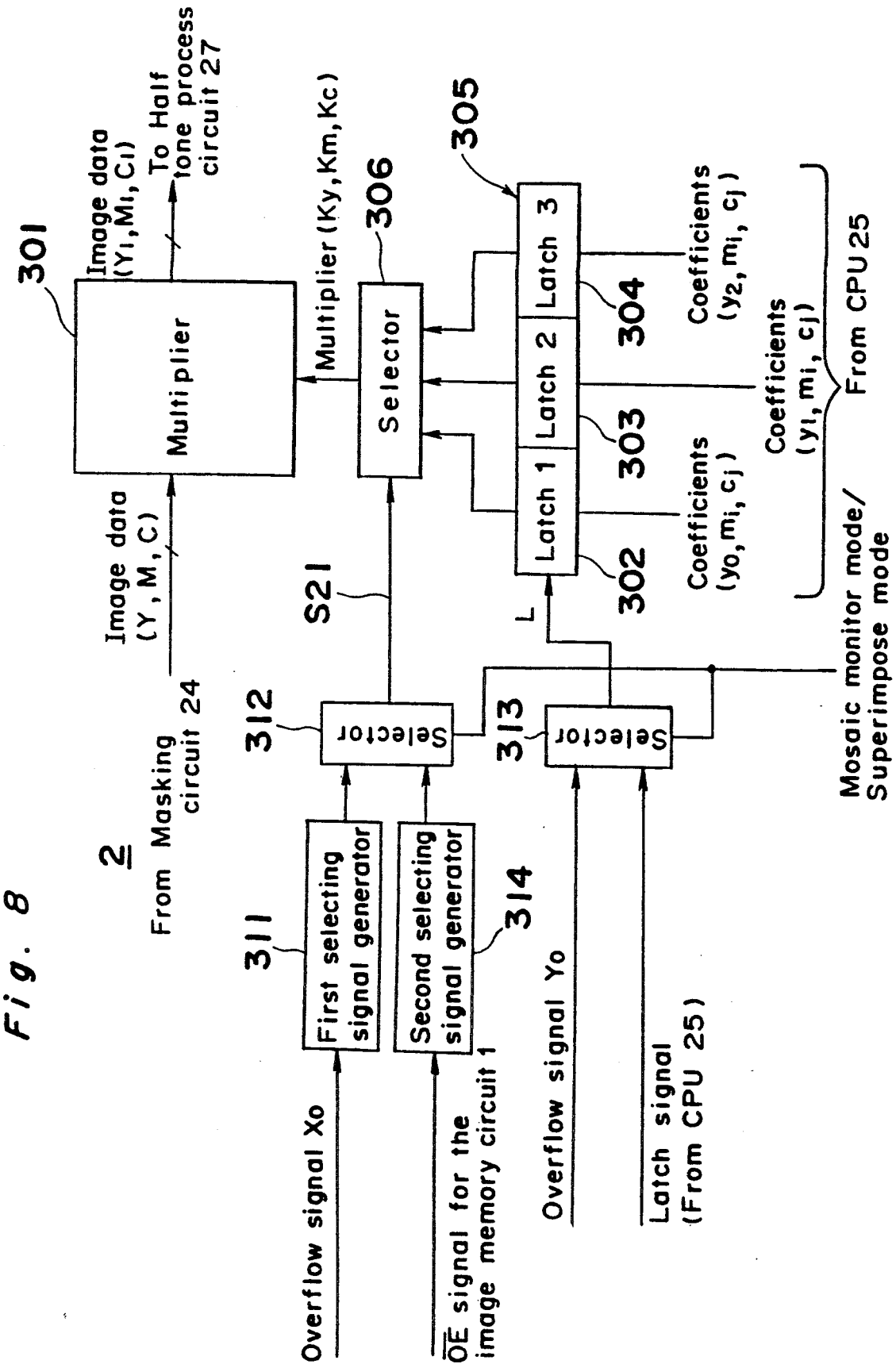
FIG. 8 is a schematic block diagram of a color tone setting circuit shown in FIG. 2.

FIG. 8 is a circuit diagram of the color tone setting circuit 2.

The color tone setting circuit 2 is arranged at the next step of the masking circuit 24, and makes the color adjustment in the mosaic monitor mode.

The masking circuit 24 converts respective image data of red color, green color and blue color into image data Y, M, C and K for printing which correspond to respective printing colors of yellow color, magenta color, cyan color and black color, and outputs the converted image data to the color tone setting circuit 2.

The well known conversion equation for converting the original image data R, G and B into the printing image data Y, M and C is expressed as follows:

$$\begin{bmatrix} Y \\ M \\ C \end{bmatrix} = \begin{bmatrix} a_{00} & a_{01} & a_{02} \\ a_{10} & a_{11} & a_{12} \\ a_{20} & a_{21} & a_{22} \end{bmatrix} \begin{bmatrix} B \\ G \\ R \end{bmatrix}$$

Respective conversion coefficients $a_{00}$ to $a_{22}$ are predetermined at proper values according to the theory and the result of the experiment so that the color image reflecting that of the original document faithfully can be obtained.

In the color adjustment of the color tone setting circuit 2, the following multiplications are performed for respective image data Y, M and C calculated by the above calculation in order to obtain adjusted printing image data $Y_1$, $M_1$ and $C_1$.

$$Y_1 = K_y \times Y,$$

$$M_1 = K_m \times M,$$

$$C_1 = K_c \times C,$$

wherein $K_y$ is the color adjustment coefficient of yellow color, $K_m$ is the color adjustment coefficient of magenta color, and $K_c$ is the color adjustment coefficient of cyan color.

It is to be noted that the printing image data K of black color is outputted for a picture element only when all the respective image data of yellow color, magenta color and cyan color are outputted since it is not necessary to make the color adjustment.

In the mosaic monitor mode, different sets of color adjustment coefficients are applied to respective blocks shown in FIG. 7. That is, the reading area designated by the coordinates $P_0(x_0, y_0)$ and $P_1(x_1, y_1)$ is divided into 27 blocks of three rows in the main scan direction X and nine columns in the subscan direction Y, and different sets of color adjustment coefficients are set at respective blocks. In this case, the color adjustment coefficient Ky of yellow color does not vary in the subscan direction Y, however, the coefficient Ky varies in the main scan direction X so that three kinds of coefficients $y_0$, $y_1$ and $y_2$ are set at the three blocks in the main scan direction X, respectively. The color adjustment coefficient Km of magenta color does not vary in the main scan direction X, however, the coefficient Km varies in the subscan direction Y in the order of $m_0$, $m_1$, $m_2$, $m_0$, $m_1$, ... every block. The color adjustment coefficient Kc of cyan color does not vary in the main scan direction X, however, the coefficient Kc varies in the subscan direction Y every three blocks in the order of $c_0$, $c_1$ and $c_2$.

Therefore, the color tone setting circuit 2 sets the color adjustment coefficients for every block of the mosaic monitor image as described above, for respective printing image data Y, M and C in the mosaic monitor mode, and outputs the adjusted printing image data to the magnification varying circuit 26.

Referring to FIG. 8, a multiplexer 301 calculates the aforementioned printing image data $Y_1$, $M_1$ and $C_1$ by using the above equations from the image data Y, M and C input from the masking circuit 24, and outputs the printing image data $Y_1$, $M_1$ and $C_1$ to the half tone process circuit 27. There is provided a latch circuit 305 comprised of three latches 302, 303 and 304 for respectively latching respective three coefficients in the main scan direction X in the mosaic monitor mode, which are input from the CPU 25. Three coefficients latched in the latch circuit 305 correspond to three blocks in the main scan direction X, respectively. Every time a subscan clock signal for varying the magnification is input to the CPU 25 as the interruption signal, the CPU 25 performs an interruption process shown in FIGS. 15a and 15b, and the CPU 25 outputs a latch signal to the color tone setting circuit 2 every block in the subscan direction Y so as to make the latches 302, 303 and 304 latch respective new three coefficients for the next three blocks in the subscan direction Y.

The reason why the above latch circuit 305 comprised of three latches 302, 303 and 304 are provided is that the alteration period of the above coefficients in the main scan direction is relatively shorter than the operation period of the CPU 25, and it is difficult for the CPU 25 to set the above coefficients in the latches 302, 303 and 304 in real time. It is to be noted that, in the case of n kinds of color adjustment coefficients, n latches may be provided in parallel.

The image memory circuit 1 outputs an overflow signal $X_0$ (See FIG. 9) in the main scan direction generated upon reading out the image data stored in an image memory 401 to a first selecting signal generator 311. Every time the first selecting signal generator 311 receives the overflow signal $X_0$, i.e., every block of the mosaic monitor image, the first selecting signal generator 311 outputs a signal S21 to a selector 306 through a selector 312 so that the selector 306 connects the multiplier 301 selectively to respective latches 302 to 304. In the mosaic monitor mode, the selector 312 outputs the signal S21 input from the first selecting signal generator 311 to the selector 306. In accordance with the signal S21, the selector 306 sends one of the respective coefficients latched in the latches 302 to 304 of the latch 305 to the multiplier 301 selectively every block.

On the other hand, the image memory circuit 1 outputs an overflow signal $Y_0$ (See FIG. 9) in the subscan direction generated upon reading out the image data stored in the image memory 401 to the selector 313. In the mosaic monitor mode, the selector 313 outputs the overflow signal $Y_0$ to the latch circuit 305. In accordance with the overflow signal $Y_0$, the latches 302 to 304 latch a set of color adjustment coefficients input from the CPU 25 so as to renew them. That is, as soon as the blocks to be processed are changed in the subscan direction to the next blocks, the set of color adjustment coefficients are altered.

In the mosaic monitor mode, when the operator selects a desirable set of color adjustment coefficients, the selected set of color adjustment coefficients may be set in the latch 302, and may be outputted to the multiplier 301.

In the superimposing mode, the selector 312 outputs a signal input from the second selecting signal generator 314 to the selector 306 so that the color tone of the area on which an image is superimposed can be different from that of the other area. Since this is well known to those skilled in the art, the description thereof is omitted therein.

(4) Image memory circuit

Figure 9:
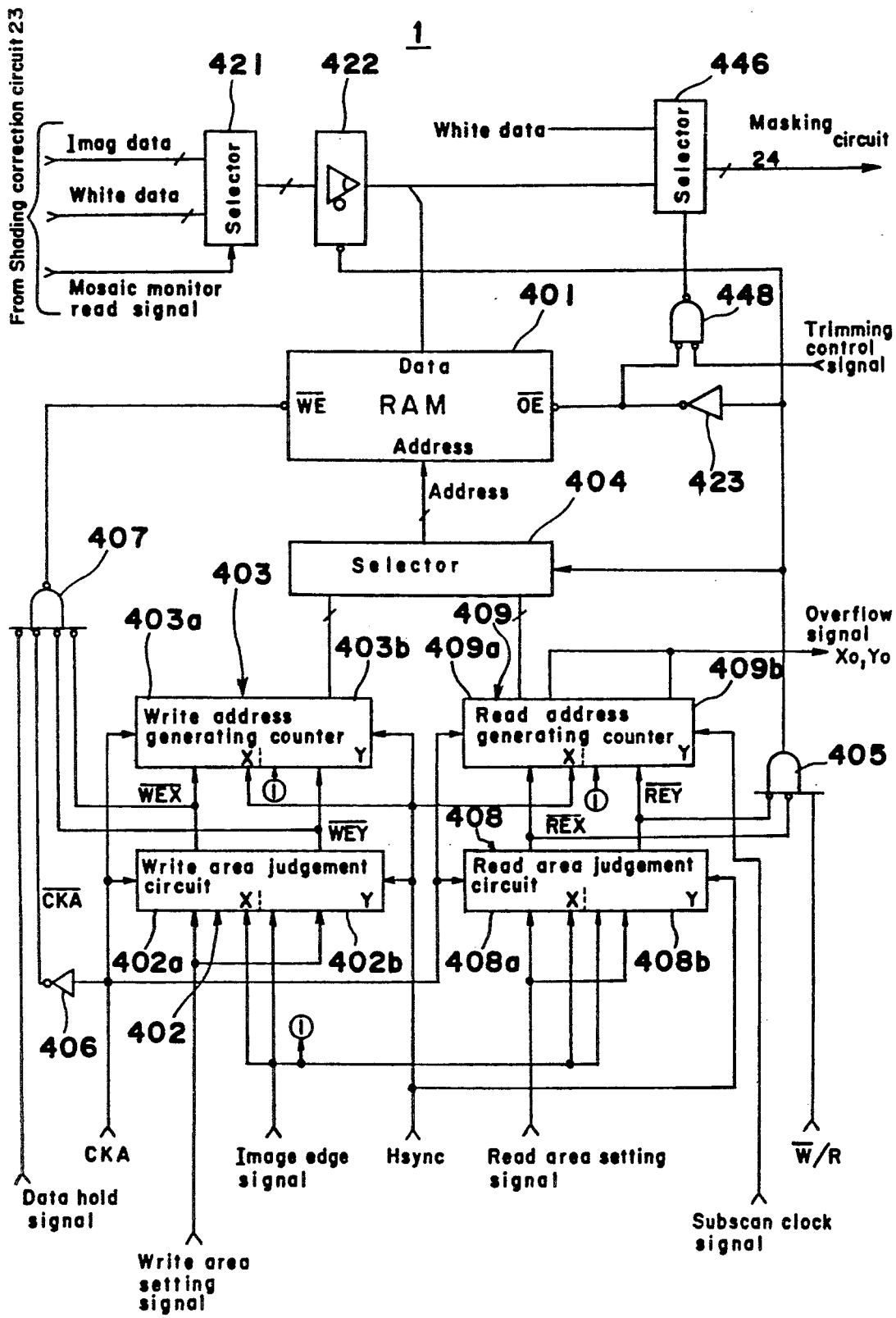
FIG. 9 is a schematic block diagram of an image memory circuit shown in FIG. 2.

FIG. 9 shows the image memory circuit 1 for storing an image of a specific area EA of a document (referred to as a registered image hereinafter) in the mosaic monitor mode, and for reading out the registered image to be printed on any specific position of a copying paper in order to print the registered image as the mosaic monitor image.

Referring to FIG. 9, the RAM 401 is provided for storing image data of the specific area EA. A selector 421 selects either one of the image data which is processed with the shading correction in the shading correction circuit 23 and white data input from the shading correction circuit 23 in accordance with the mosaic read signal input from the shading correction circuit 23, and outputs the selected data to the RAM 401 and a selector 446 through a three-state buffer amplifier 422. The output terminal of three-state buffer amplifier 422 is made a high impedance state only when the registered image is read out from the RAM 401 (i.e., $\overline{OE}$ = "1") upon printing the mosaic monitor image, and in the other cases, i.e., when the mosaic monitor image is not printed in the mosaic monitor mode, the three-state buffer amplifier 422 outputs white data. Furthermore, when image data of a specific area EA of a document is stored in the RAM 401 in the mosaic monitor mode, the three-state buffer amplifier 422 outputs the image data to the RAM 401.

In the mosaic monitor mode, in order to make a color adjustment for the registered image data, the image data is stored in the RAM 401 temporarily by using the selector 446 and the three-state buffer amplifier 422 before the processes performed by the circuits 24, 25, 26 and 27. After the image data is read out from the RAM 401, various kinds of color adjustments are made for the mosaic monitor image, and the color-adjusted mosaic monitor image is printed on a copying paper.

A write area judgment circuit 402 judges whether or not the image data read by the reading section 100 is within a write area in the main scan direction X and in the subscan direction Y in accordance with write area setting signals in the main scan direction X and in the subscan direction Y which are input from the CPU 25. When the image data read by the reading section 100 is within the above write area, the write area judgment circuit 402 outputs Low level signals $\overline{WEX}$ and $\overline{WEY}$ to inverted input terminals of an AND gate 407 and a write address generating counter 403. The AND gate 407 outputs the clock signal $\overline{CKA}$ to a write enable terminal $\overline{WE}$ of the RAM 401 in accordance with the Low level signals $\overline{WEX}$ and $\overline{WEY}$, so as to store the image data in the RAM 401.

Similarly, a read area judgment circuit 408 judges whether or not the image data read by the reading section 100 is within a read area in the main scan direction X and in the subscan direction Y in accordance with read area setting signals in the main scan direction X and in the subscan direction Y which are input from the CPU 25. When the image data read by the reading section 100 is within the above read area, the read area judgment circuit 408 outputs Low level signals $\overline{REX}$ and $\overline{REY}$ to inverted input terminals of an AND gate 405 and a read address generating counter 409. The above read area is predetermined according to the output format.

In accordance with Low level signals $\overline{REX}$ and $\overline{REY}$, the AND gate 405 outputs a read signal $\overline{W}/R$ to an output enable terminal $\overline{OE}$ of the RAM 401 through an inverter 423, i.e., a Low level signal is input to the output enable terminal $\overline{OE}$ of the RAM 401 so that the reading operation of the RAM 401 is enabled.

The write address generating counter 403 generates a write address for storing image data in the RAM 401 in accordance with the clock signal CKA, the horizontal synchronizing signal Hsync, and the above signals $\overline{WEX}$ and $\overline{WEY}$, and outputs the generated write address to the address terminal of the RAM 401 through a selector 404. Similarly, the read address generating counter 409 generates a read address for reading out image data stored in the RAM 401 in accordance with the clock signal CKA, the subscan clock signal, and the above signals $\overline{REX}$ and $\overline{REY}$, and outputs the generated read address to the address terminal of the RAM 401 through the selector 404. The above selector 404 selectively outputs either the write address or the read address to the address terminal of the RAM 401 in accordance with the write/read signal $\overline{W}/R$. It is to be noted that both the write address and the read address are generated as an address of one dimension by a multiplier (not shown) based on an address in the main scan direction X and an address in the subscan direction Y generated by the write address generating counter 403 and the read address generating counter 409, respectively.

The selector 446 and the AND gate 448 are provided to output white data on the area of the superimposing image upon printing the image of the document in the superimposing mode. The detailed description of the selector 446 and the AND gate 448 is omitted since they are not the subject matter of the present invention. Except for the case that a trimming signal is outputted in the superimposing mode, the selector 446 selectively outputs either a signal outputted from the three-state buffer amplifier 442 or a signal outputted from the RAM 401.

The action of the image memory circuit 1 will be described below in detail.

In the case that the registered image is stored in the RAM 401, when the operator specifies a specific area EA of a document using the jog dials 82 and 83 as shown in FIG. 5, the CPU 25 calculates the coordinate ($x_0$, $y_0$) of the top right edge of the specific area EA and the coordinate ($x_1$, $y_1$) of the bottom left edge thereof in order to determine the ranges of the specific area EA in the main scan direction X and the subscan direction Y, and outputs the above calculated coordinates ($x_0$, $y_0$) and ($x_1$, $y_1$) as the write area setting signal for representing the write area in the main scan direction X and the subscan direction Y to an X section 402a and a Y section 402b of the write area judgment circuit 402, respectively. The X section 402a and the Y section 402b of the write area judgment circuit 402 count the horizontal synchronizing signal Hsync and the clock signal CKA when the image edge signal is input thereto, and judges whether or not the counting value is within the write area setting area. Then, when the counting value x in the main scan direction X of the X section 402a is within the range from the value $x_0$ to the value $x_1$, i.e., $x_0 \leq x \leq x_1$, the X section 402a outputs a Low level signal $\overline{WEX}$ to the X section 403a of the write address generating counter 403. When the counting value y in the subscan direction Y of the Y section 402b is within the range from the value $y_0$ to the value $y_1$, i.e., $y_0 \leq y \leq y_1$, the Y section 402b outputs a Low level signal $\overline{WEY}$ to the Y section 403b of the write address generating counter 403. When the write address generating counter 403 judges that the counting values x and y are within the write area, the counter 403 generates a write address and outputs it to the address terminal of the RAM 401 through the selector 404. That is, the X section 403a of the write address generating counter 403 counts the clock signal CKA when the Low level signal $\overline{WEX}$ is input thereto, and generates the counting value as the address in the main scan direction X. The address generated by the X section 403a is cleared in accordance with the horizontal synchronizing signal Hsync. Furthermore, the Y section 403b of the write address generating counter 403 counts the horizontal synchronizing signal Hsync when the Low level signal $\overline{WEY}$ is input thereto, and generates the counting value as the address in the subscan direction Y. The addresses generated by the X section 403a and the Y section 403b are cleared in accordance with the image edge signal which is generated by the CPU 25.

The write address generating counter 403 comprises a multiplier (not shown) and an adder (not shown) for calculating addresses of one dimension, each of which is a product of the address in the main scan direction X generated by the X section 403a and the address in the subscan direction Y generated by the Y section 403b.

In the case where the address of one dimension is generated by the write address generating counter 403 and the image data are stored in the RAM 401, the data hold signal is set at a Low level, and the write/read signal $\overline{W}/R$ is set at a Low level. Then, in accordance with a selecting signal input through the AND gate 405, the selector 404 outputs the address input from the write address generating counter 403 to the address terminal of the RAM 401. Also, the clock signal $\overline{CKA}$ is input to the write enable terminal $\overline{WE}$ of the RAM 401 through the inverter 406 and the AND gate 407 so as to allow the image data to be stored in the RAM 401. Furthermore, since the write/read signal $\overline{W}/R$ is set at a Low level as described above, the Low level write/read signal $\overline{W}/R$ is input to the disable terminal of the buffer amplifier 422 through the AND gate 405, the buffer amplifier 422 is enabled only on the condition that image data of a document is stored in the RAM 401, i.e., the Low level signals $\overline{REX}$ and $\overline{REY}$ are outputted from the read area judgment circuit 408 to the AND gate 405, and then, the buffer amplifier 422 outputs the image data to the data terminal of the RAM 401.

Then, only the image data of the area which the write area judgment circuit 402 judges within the specific area in the main scan direction X and in the subscan direction Y can be stored in the RAM 401. When the image data of the above area has been stored in the RAM 401 completely, the CPU 25 outputs the High level data hold signal to the write enable signal $\overline{WE}$ of the RAM 401 through the AND gate 407 so as to inhibit the write operation of the RAM 401, resulting in that the image data is held by the RAM 401.

It is necessary to read out the image data stored in the RAM 401 so as to print mosaic monitor images at the specific read area in the output format shown in FIG. 7. The composition of the circuit for reading out the image data is substantially the same as that of the circuit for storing the image data.

The setting values, which can be judged within the range of the specific read area on the condition that $x_0 \leq x \leq x_1$ and $y_0 \leq y \leq y_1$, are preset by the CPU 25 in the X section 408a and the Y section 408b of the read area judgment circuit 408 for judging a read area on a copying wherein $x_0$ and $y_0$ are an X-coordinate and a Y-paper, coordinate of the top left edge of the specific read area, respectively, and $x_1$ and $y_1$ are an X-coordinate and a Y-coordinate of the bottom right edge thereof, respectively, as shown in FIG. 7. After the image edge signal is input to the read area judgment circuit 408 when the document is scanned, the read area judgment circuit 408 counts the horizontal synchronizing signal Hsync and the clock signal CKA, and also judges whether or not the counting values thereof are within the range of the specific read area. Then, when the counting value in the main scan direction X is within the range of the specific read area, the X section 408a of the read area judgment circuit 408 outputs the Low level signal $\overline{REX}$ to the X section 409a of the read address generating counter 409. When the counting value in the subscan direction Y is within the range of the specific read area, the Y section 408b of the read area judgment circuit 408 outputs the Low level signal $\overline{REY}$ to the Y section 409b of the read address generating counter 409.

When the read area judgment circuit 408 judges that the image data read by the reading section 100 is within the read area, i.e., the Low signals $\overline{REX}$ and $\overline{REY}$ are input to the read address generating counter 409, the read address generating counter 409 generates the read address, and outputs the generated read address to the address terminal of the RAM 401 through the selector 404 since the High write/read signal $\overline{W/R}$ is input to the selector 404 upon reading out the image data stored in the RAM 401. That is, the X section 409a of the read address generating counter 409 counts the clock signal CKA when the Low signal $\overline{REX}$ is input thereto, and generates the address in the main scan direction X. The address generated by the X section 409a is cleared in accordance with the horizontal synchronizing signal Hsync. Furthermore, the Y section 409b of the read address generating counter 409 counts the subscan clock signal input from the subscan clock generator 29 when the Low level signal $\overline{REY}$ is input thereto, and generates the address in the subscan direction. The Y section 409b counts the subscan clock signal in place of the horizontal synchronizing signal Hsync in order to vary the magnification. It is to be noted that the address generated by the Y section 409b is cleared in accordance with the image edge signal generated by the CPU 25. In the read address generating counter 409, the product of the address in the main scan direction X generated by the X section 409a and the address in the subscan direction Y generated by the Y section 409b are calculated by a multiplier (not shown) and an adder (not shown), and the calculated product is outputted as the address of one dimension to the RAM 401 through the selector 404.

The image data read out from the RAM 401 is sent to the masking process circuit 24 through the selector 446. Then, of course, the read address counter 409 generates the address larger than the maximum address of the RAM 401, however, in this case, the X and Y sections 409a and 409b thereof output an overflow signal $X_j$ and an overflow signal $Y_0$ to the color tone setting circuit 2, respectively, every time the counting values of the X and Y sections 409a and 409b thereof become larger than the maximum counting values thereof, and then, the X and Y sections 409a and 409b start to count the values from the initial values again. The overflow signals $X_0$ and $Y_0$ are used for printing a plurality of images respectively having different color tones when the images are arranged in the horizontal direction in the mosaic monitor mode.

Furthermore, since the write/read signal $\overline{W/R}$ becomes a High level upon reading out the image data stored in the RAM 401, the Low rite/read signal $\overline{W/R}$ is input to the output enable terminal $\overline{OE}$ of the RAM 401 through the AND gate 405 and the inverter 423, and then, the image data stored in the RAM 401 can be read out in the read area, i.e., in the case of $\overline{REX}=$"Low" and $\overline{REY}=$"Low". On the other hand, since the low write/read signal $\overline{WR}$ is input to the three-state buffer amplifier 422 through the AND gate 405 in the case of $\overline{REX}=$"Low" and $\overline{REY}=$"Low", the output terminal of the three-state buffer amplifier 422 becomes a High impedance state, and then, the output terminal of the buffer amplifier 422 is separated from the data terminal of the RAM 401.

Furthermore, when image data stored in the RAM 401 can be read out, i.e., $\overline{OE}=$"Low", the selector 446 selects the image data read out from the RAM 401 in accordance with the trimming control signal input through the AND gate 448. On the other hand, in the other cases, since it is necessary to read out the image data stored in the RAM 401 so as to print the image of the image data in the output format shown in FIG. 7, the selector 446 selects white data in order to print white color image in the area of the copying paper other than the area where the image of the image data is printed as described above. Then, the coordinates, for which the difference between the magnification upon reading out an image of a document and the magnification upon printing the image of the image data stored in the RAM 401 have been taken into consideration, are set in the X and Y sections 408a and 408b of the read area judgment circuit 408, respectively. It is to be noted that the period of the subscan clock signal for varying the magnification is varied according to the magnification upon reading out an image of a document.

In the case that the images of $3\times 9$ blocks are printed as shown in FIG. 7, the image data is read out from the RAM 401 in a following manner. That is, the image data of the same line is read out in the main scan direction X three times, and after the image data is completely read out in the subscan direction Y over the whole area, the image data is read out in the main scan direction from the top line again.

When the X and Y sections 408a and 408b of the read area judgment circuit 408 for judging the read area on a copying paper output the Low signals $\overline{REX}$ and $\overline{REY}$ to the X and Y sections 409a and 409b of the read address generating counter 409, respectively, the X and Y sections 409a and 409b generate the address, and the image data stored in the generated address is read out and is sent to the masking circuit 24 through the selector 446. The CPU 25 sets setting values in the X section 408a which can judge that the counting value x is in the range of the read area if $x_0 \leq x \leq x_1$, and also the CPU 25 sets setting values in the Y section 408b which can judge that the counting value y is in the range of the read area if $y_0 \leq y \leq y_1$. When the counting value of the read address generating counter 409 becomes larger than the value which is the maximum size ($=(x_1-x_0)/3$) of one block, the read address generating counter 409 outputs the overflow signal $X_0$, and starts to count the value from an initial value again, and then, the image data of the same horizontal line is read out. The above process is repeated three times. When the Y section 409b of the read address generating counter 409 counts the value $(y_1-y_0)/9$ in the subscan direction, three blocks of image data have been read out completely, and then, the Y section 409b outputs the overflow signal $Y_0$. Thus, three images are printed in the horizontal direction on a copying paper. The printing operation of three images printed in the horizontal direction is repeated in the subscan direction nine times, and then, the mosaic monitor image comprised of 27 blocks ($=3\times9$) of images has been completely printed on the copying paper.

Figure 15A:
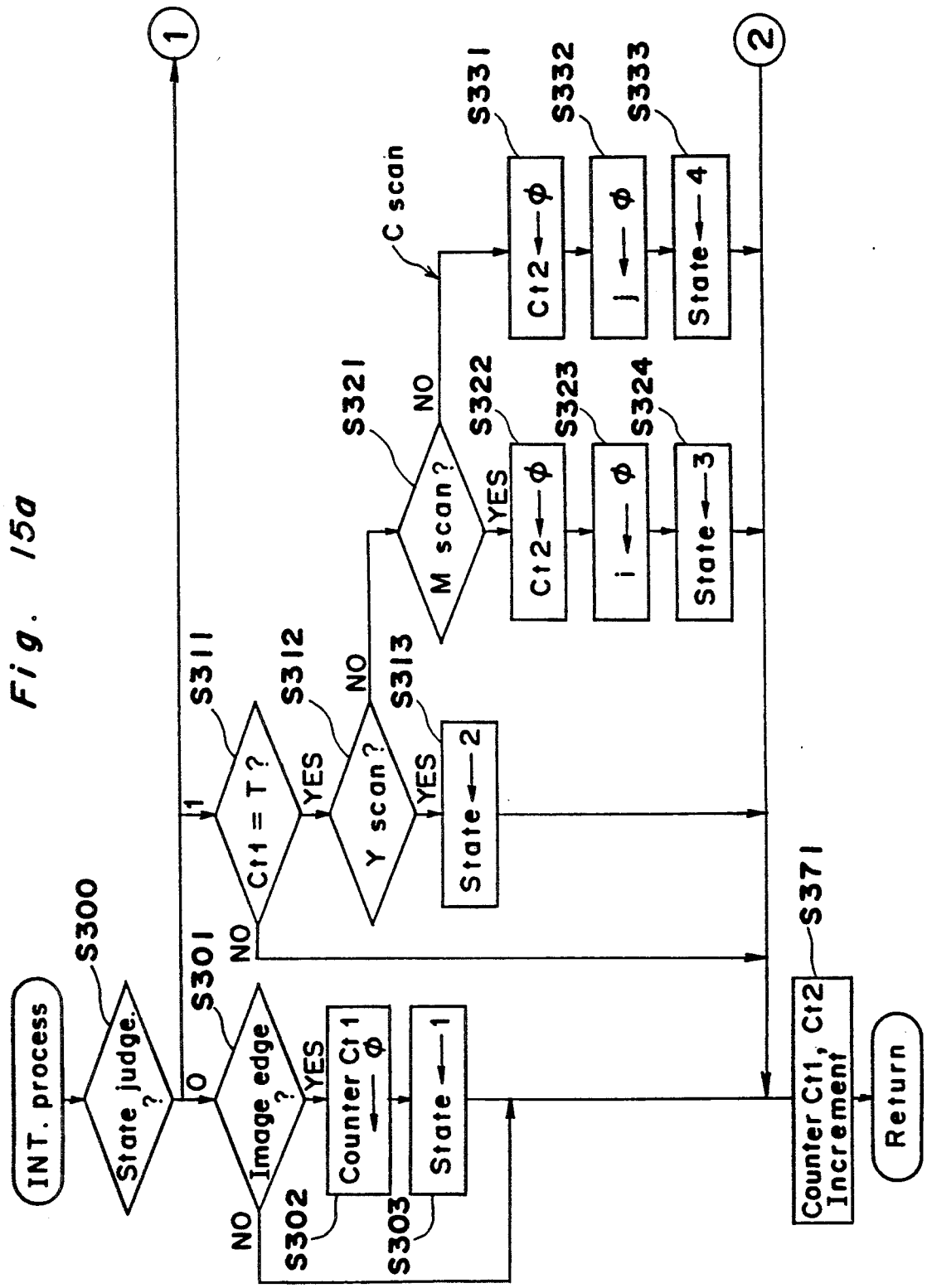
FIGS. 15a and 15b are flow charts of an interruption process of the digital color copying machine.
Figure 15B:
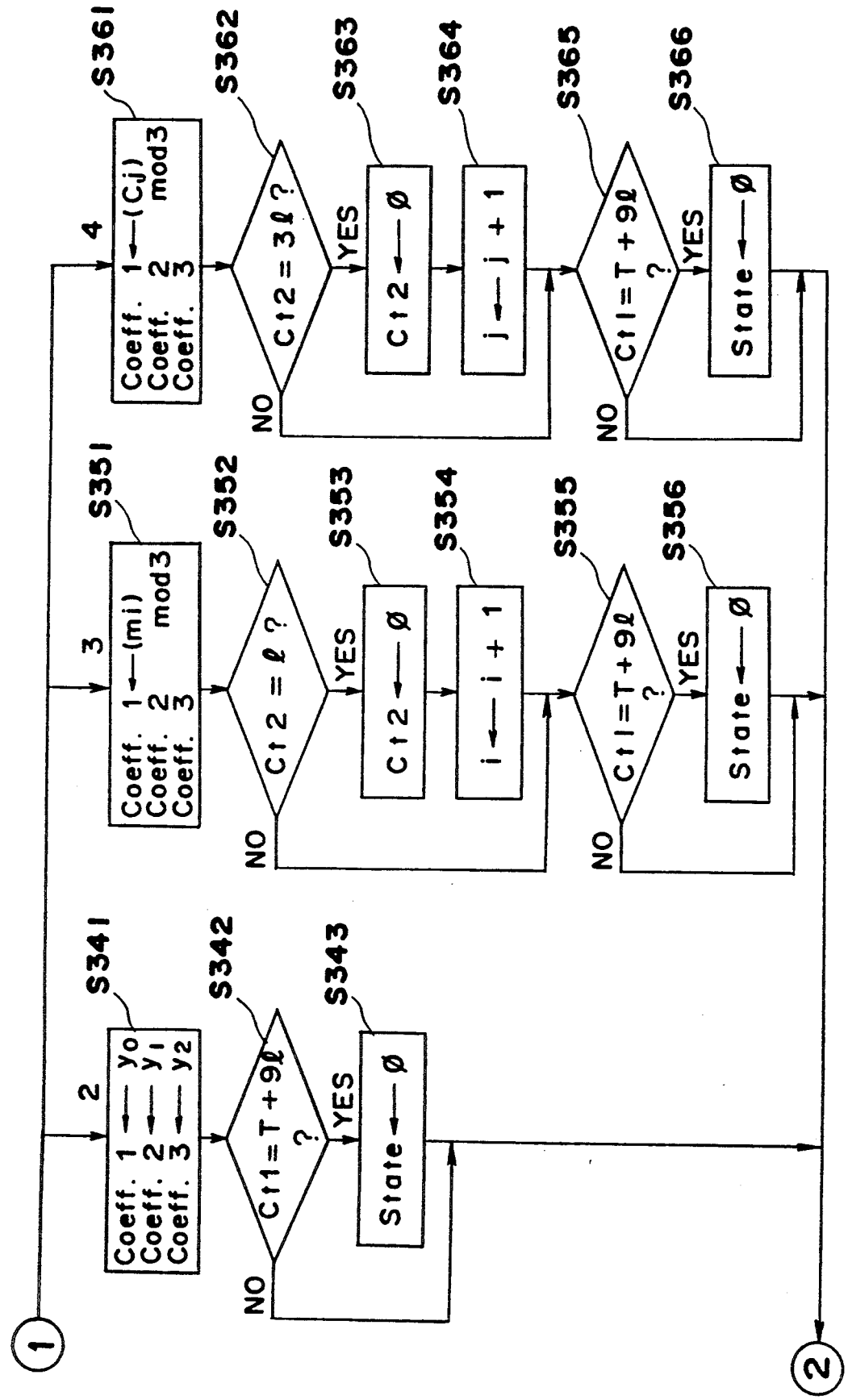

Since different color adjustment coefficients are set at respective blocks of the mosaic monitor image in accordance with the overflow signals $X_0$ and $Y_0$ as shown in FIGS. 15a and 15b, respective images for which different color adjustments are made are printed on the copying paper.

(5) Storing mode setting values to be set in the mosaic monitor mode and selecting an image having a desirable color balance.

In the present preferred embodiment, when mode setting values to be set in the mosaic monitor mode such as the size of copying paper, the magnification, the density, the color adjustment level etc. are stored in the memory, new selection of the mosaic monitor mode is inhibited. In the case of canceling the mosaic monitor mode without selecting an image having a desirable color balance, the data stored in the mode memory 36 shown in FIG. 6 is cleared.

In the mosaic monitor mode of the present preferred embodiment, when an image having a desirable color balance is not selected even after a constant time such as one minute has been passed after the mosaic monitor image has been printed on the copying paper, respective setting values to be set in the mosaic monitor mode are automatically stored in the mode memory 36 shown in FIG. 6, and then, the program flow returns to the initial mode of the digital color copying machine.

In order to execute the above process, the time (T) 40 is provided as shown in FIG. 6. When the CPU 25 outputs the mosaic monitor image, the timer (T) 40 is made to start to count the value at step S54 of FIG. 14a. Thereafter, when the time (T) 40 has counted a predetermined value, the mode setting values of the mosaic monitor mode are automatically stored in the mode memory 36 at step S76 of FIG. 14b, and then, the program flow returns to the initial mode at step S78 of FIG. 14b.

The mode setting values (referred to as mode data hereinafter) to be stored in the mode memory 36 are as follows:

(a) The size of the copying paper—A3
(b) The magnification—equal magnification
(c) The number of copies—one copy
(d) The selecting state of the mosaic monitor mode—selected
(e) The density level—standard value
(f) The color adjustment standard levels—5, 5 and 5
(g) The color mode—full color mode The above color adjustment levels are respectively set at, for example, integer values in the range from one to nine corresponding to the color adjustment coefficients of respective colors.

When an image having a desirable color balance is determined from the mosaic monitor image, the operator presses the mosaic monitor mode memory read key 81 of the operation panel 70. Then, in the initial setting process (step S1 of FIG. 10 and FIG. 11), the data stored in the mode memory 36 are read out at step S12 of FIG. 11, the program flow returns to the state when the mosaic monitor image has been printed on the copying paper. Therefore, the operator can select an image having a desirable color balance from the mosaic monitor image soon.

On the other hand, in order to judge whether or not the mode data is stored in the mode memory 36, there is provided a mosaic monitor mode (MMM) memory flag. When the mosaic monitor mode is selected, it is judged according to the mosaic monitor mode memory flag whether or not the mode data is stored in the mode memory 36. When it is judged that the mode data is stored in the mode memory 36, new selection of the mosaic monitor mode is inhibited. Then, the mode data stored in the mode memory 36 is kept as they are so as to be protected, and the image data of the selected image has been stored in the RAM 401. Therefore, as soon as the image to be printed on the copying paper is selected, the selected image having the desirable color balance which has been set already can be printed on the copying paper.

After printing the mosaic monitor image on the copying paper, the operator may judge that it is not necessary to execute another process, i.e., it is not necessary to select an image having a desirable color balance from the mosaic monitor image. In this case, such a simple operation that the mosaic monitor mode memory read key 81 and the all reset key 74 are pressed sequentially leads to clear the mode data stored in the mode memory 36 at steps S11, S15 and S16 of FIG. 11. Therefore, it is not necessary to do a complicated operation such as a useless selection of an image having a desirable color balance.

In the present preferred embodiment, when the timer (T) 40 counts the predetermined value after printing the mosaic monitor image on the copying paper, the mode data to be set in the mosaic monitor mode are stored in the mode memory 36. However, the present invention is limited to this. There may be provided an instruction key for instructing to store the mode setting values in the mode memory 36. In this case, for example, when the operator judges whether or not it takes a long time to select a desirable image to be printed on the copying paper, he presses the above instruction key so as to store the mode data in the mode memory 36, and then, the normal copying operation etc. can be performed. Furthermore, the mode data to be set in the mosaic monitor mode may be stored in the mode memory 36 when a main switch (not shown) of the digital color copying machine is turned off after printing the mosaic monitor image on the copying paper.

Furthermore, when another key is pressed or the main switch is turned off in place of pressing the all reset key 74, the mode data stored in the mode memory 36 may be cleared.

(6) Control flow in mosaic monitor mode

Figure 10:
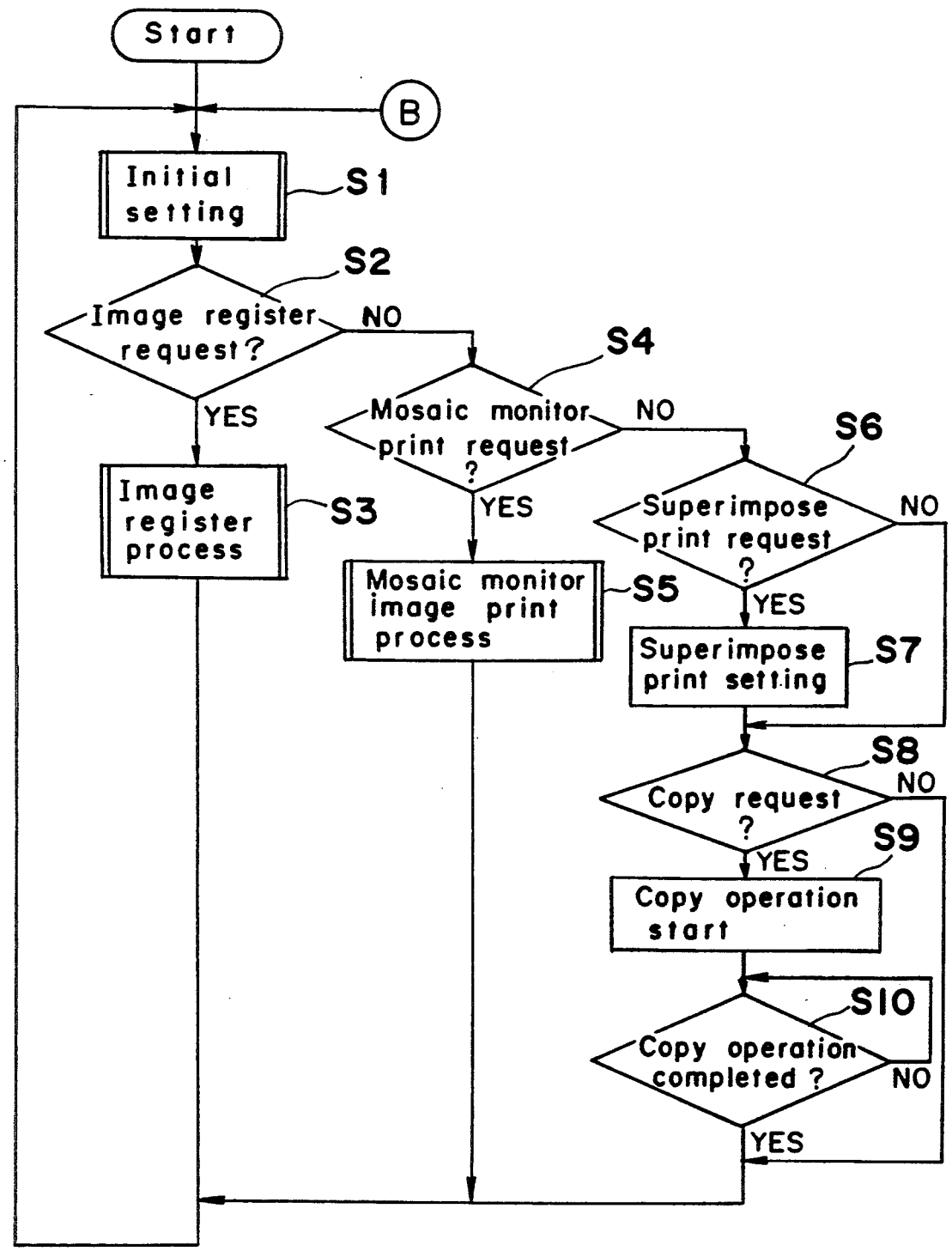
FIG. 10 is a flow chart of a main flow of a mosaic monitor mode of the digital color copying machine shown in FIG. 1.

FIG. 10 is a flow chart of a main flow of the mosaic monitor mode and the superimposing mode performed by the CPU 25 for controlling the digital color copying machine. When the main switch is turned on so that power is supplied to the digital color copying machine, the CPU 25 and the peripheral units thereof are initialized.

Figure 11:
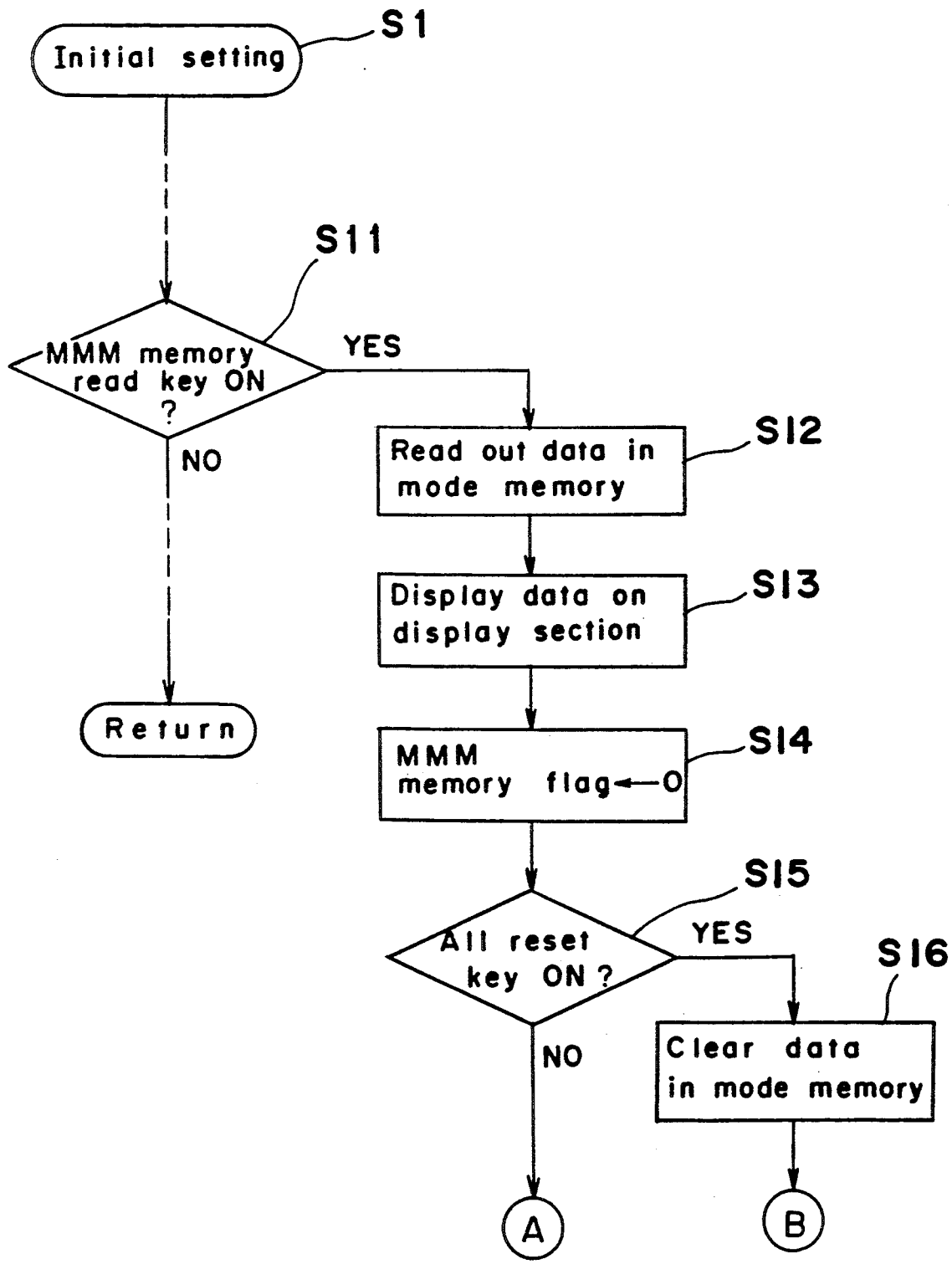
FIG. 11 is a flow chart of an initial setting process shown in FIG. 10.
Figure 12:
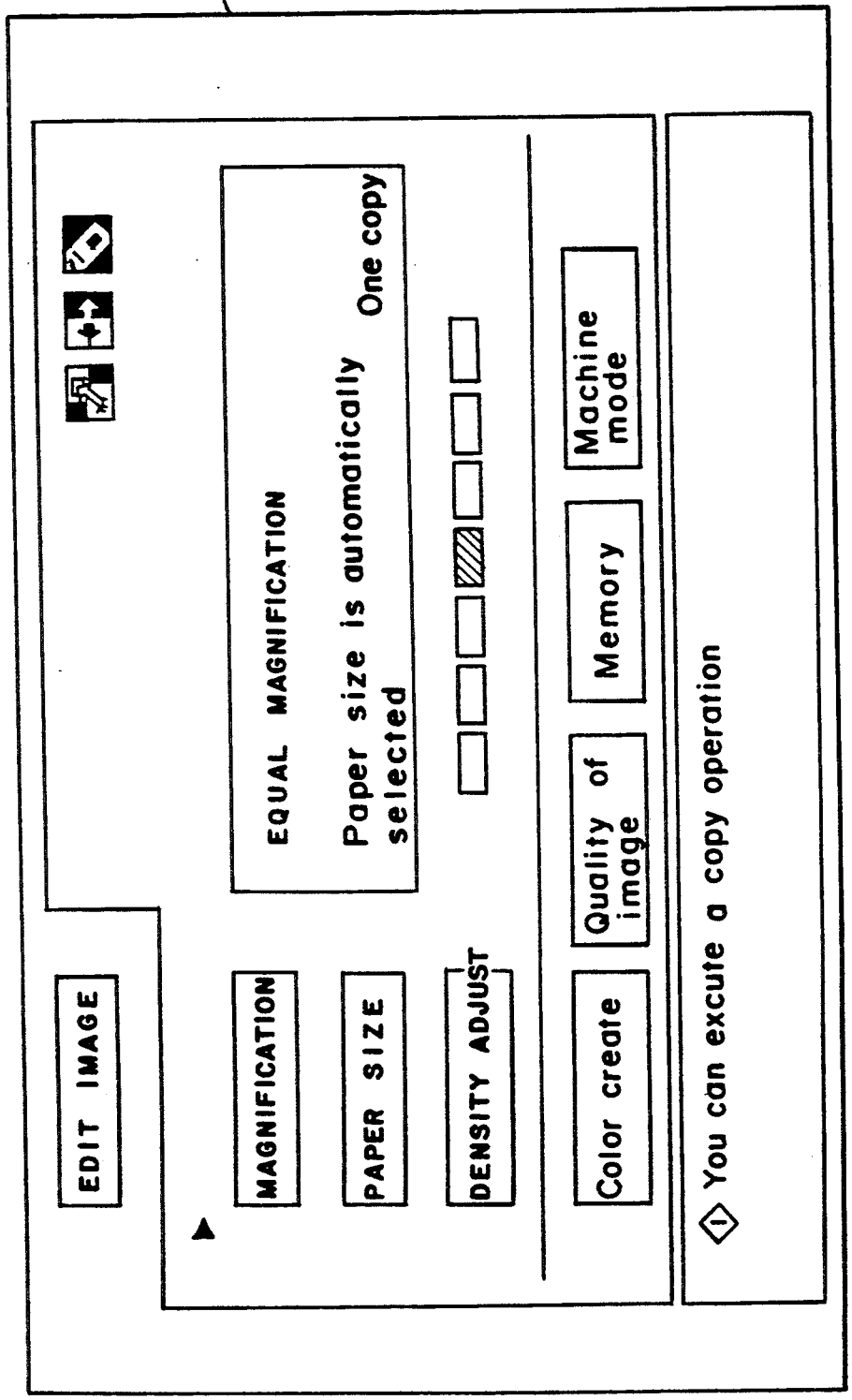
FIG. 12 is a front view of an image of an initial mode displayed on the display section shown in FIG. 4.

First of all, the initial setting process is performed at step S1 of FIG. 10 (See FIGS. 11 and 12). Namely, as the condition for the copying operation such as the number of prints, the magnification, the size of the copying paper, an initial condition such as one print, the equal magnification, a mode for automatically selecting the size of the copying paper is set and a standard value is set as the density, and then, the copying operation can be performed. Furthermore, the mosaic monitor mode etc. can be selected. Thus, the initial mode is set.

Thereafter, various kinds of processes are performed as follows.

When the mosaic monitor mode is selected, an image register process is required (Yes at step S2), and also it is required to print the mosaic monitor image (Yes at step S4). When the superimposing mode is selected, the image register process is required (Yes at step S2), and also it is required to print one image superimposed on another image in the superimposing mode (Yes at step S6).

Figure 13:
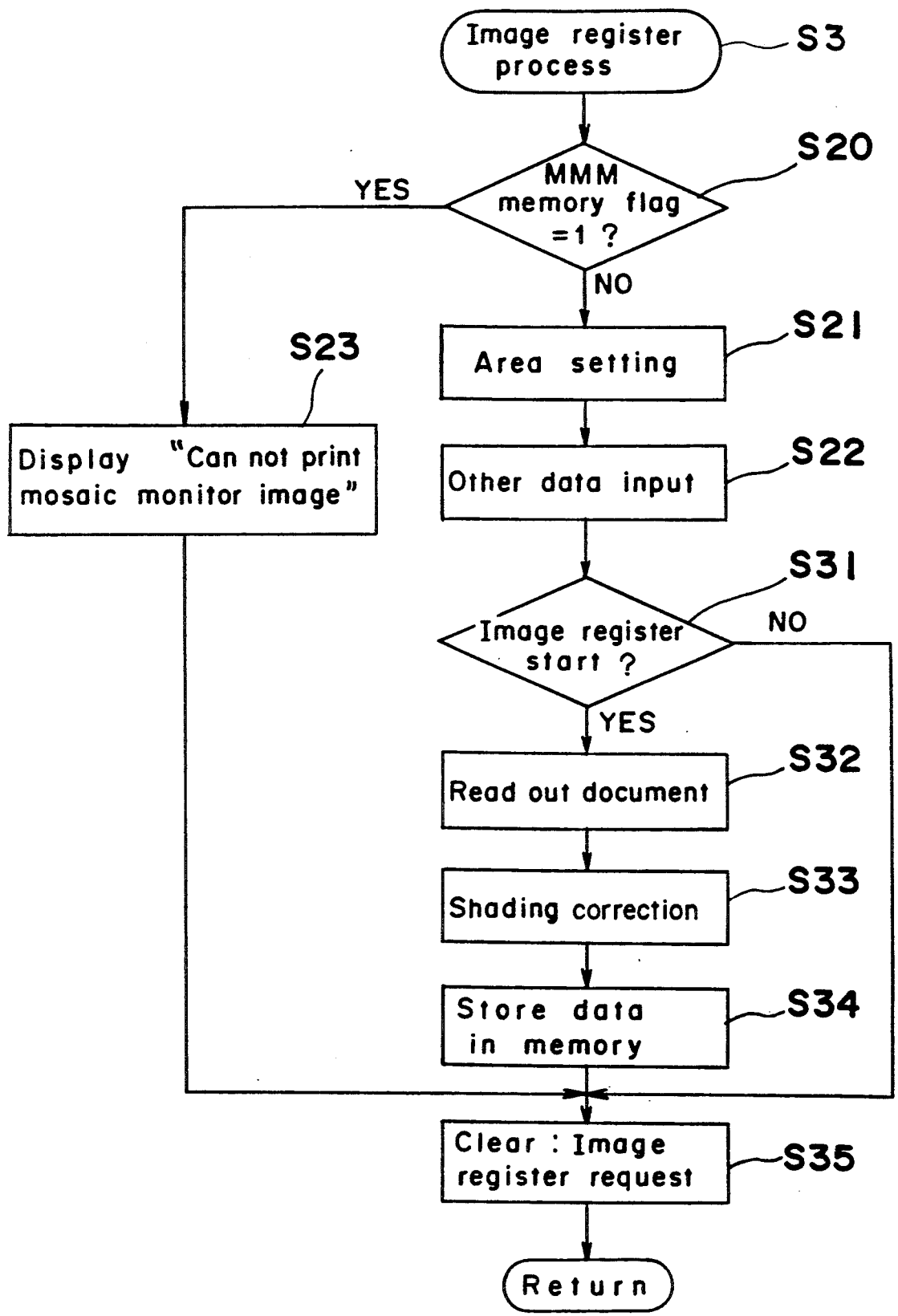
FIG. 13 is a flow chart of an image register process shown in FIG. 10.

If the image register process is required (Yes at step S2), the image register process shown in FIG. 13 is performed at step S3. "The image register" is to store the image data of the specified area in the RAM 401.

In the above image register process, an image of a document is read by the reading section 100, and the read image is displayed on the display section 84. Thereafter, a specific area EA is set by using the jog dials 82 and 83, and the set key 76, and the address of the specific area EA is outputted to the write area adjustment circuit 402.

If it is required to print the mosaic monitor image on a copying paper (Yes at step S4), the mosaic monitor image printing process shown in FIG. 14 is performed at step S5. In the mosaic monitor printing process, the image data stored in the RAM 401 is read out, and various kinds of color adjustments are made for the read image data, and thereafter, the mosaic monitor image comprised of the images for which the above color adjustments are made is displayed on the display section 84. Then, the copying condition such as the number of prints, the magnification etc. is reset to a predetermined initial state, and the level of the density adjustment is set at a standard level. Thereafter, the operator selects an image having a desirable color tone from the mosaic monitor image displayed on the display section 84, and presses the print start key 71 of the operation panel 70 in order to request a copying operation (Yes at step S8). Then, the copying operation is started at step S9, and when the copying operation is completed (Yes at step S10), the image having the selected color balance is printed on the copying paper.

When it is required to print one image superimposed on another image in the superimposing mode (Yes at step S6), the superimposing printing setting process is performed at step S7. Namely, after checking whether or not the registered image is stored in the RAM 401, the registered image stored therein is read out. Thereafter, when the copying operation is required (Yes at step S8), the copying operation is performed at steps S9 and S10 so as to print the registered image on an image of a document.

If the image register is not required (No at step S2), it is not required to print the mosaic monitor image on a copying paper (No at step S4), and it is not required to print one image superimposed on another image in the superimposing mode (No at step S6), the above copying operation is performed at steps S8 to S10.

FIG. 11 is a flow chart of the initial setting process (step S1 of FIG. 10).

In the initial setting process, as described above, as the copying conditions such as the number of prints, the magnification, the size of the copying paper etc., the predetermined initial condition such as one print, the equal magnification, the mode for automatically selecting the size of the copying paper is set and the density level is set at the predetermined standard value, and then, an image shown in FIG. 12 is displayed on the display section 84. The detailed drawing of the image to be displayed is omitted in FIG. 12. Then, the copying operation can be performed and the mosaic monitor mode etc. can be selected. Namely, the initial mode is set.

As shown in FIG. 11, when the mosaic monitor mode memory read key 81 is pressed (Yes at step S11), the mode data stored in the mode memory 36 is read out at step S12, and the data displayed on the display section 84 of the operation panel 70 immediately before storing them in the mode memory 42 temporarily is displayed thereon again at step S13, and then, the mosaic monitor mode memory flag is set at zero at step S14.

Thereafter, it is judged whether or not the all reset key 74 is turned on at step S15. When the all reset key 74 is pressed, it is not necessary to perform the process after printing the mosaic monitor image, namely, a desirable image is not selected, the mode data stored in the mode memory 36 is cleared at step S16, and the initial setting process is performed again at step S1 of FIG. 10. On the other hand, when the all reset key 74 is not pressed (No at step S15), the program flow goes to step S71 of FIG. 14a.

It is to be noted that, when the all reset key 74 is pressed, in the initial setting process, the image of the initial mode shown in FIG. 12 is displayed on the display section 84.

FIG. 13 is a flow chart of the image register process of step S3 shown in FIG. 10.

Referring to FIG. 13, first of all, it is judged at step S20 whether or not the mosaic monitor mode memory flag indicating that the mode data are stored in the mode memory 36 is set at "1". When the mosaic monitor mode memory flag is set at "1" (See step S77 of FIG. 14), such a message that "Can not print mosaic monitor image" is displayed on the display section 84 so as to warn the operator at step S23 since a desirable image must be selected. Thereafter, the program flow goes to step S35, and then, the image resister request is cleared so as not to accept a new request for the mosaic monitor mode.

On the other hand, when the mosaic monitor mode memory flag is not set at "1" the program flow goes to the process of the mosaic monitor mode anew, and then, when the set key 76 of the operation panel 70 is pressed, the area setting values displayed then on the display section 84 is input to the CPU 25 so as to set the specified area at step S21. Thereafter, the other input values are set at step S22.

Thereafter, it is judged whether or not the image register process is started at step S31. When the image register process is started, the coordinates of the top right edge and the bottom left edge of the area of the registered image are calculated from the area setting values having been input at step S21, and the image of the document of the specified area thereof is read out at step S32. Thereafter, the shading correction is made for the image data of the image thereof at step S33, and the corrected image data is stored in the RAM 401 at step S34. Thereafter, the image register request is cleared at step S35, and the program flow returns.

On the other hand, when the image register is not started (No at step S31), the program flow goes to step S35 directly, and then, the image register request is cleared at step S35, and the program flow returns.

Figure 14A:
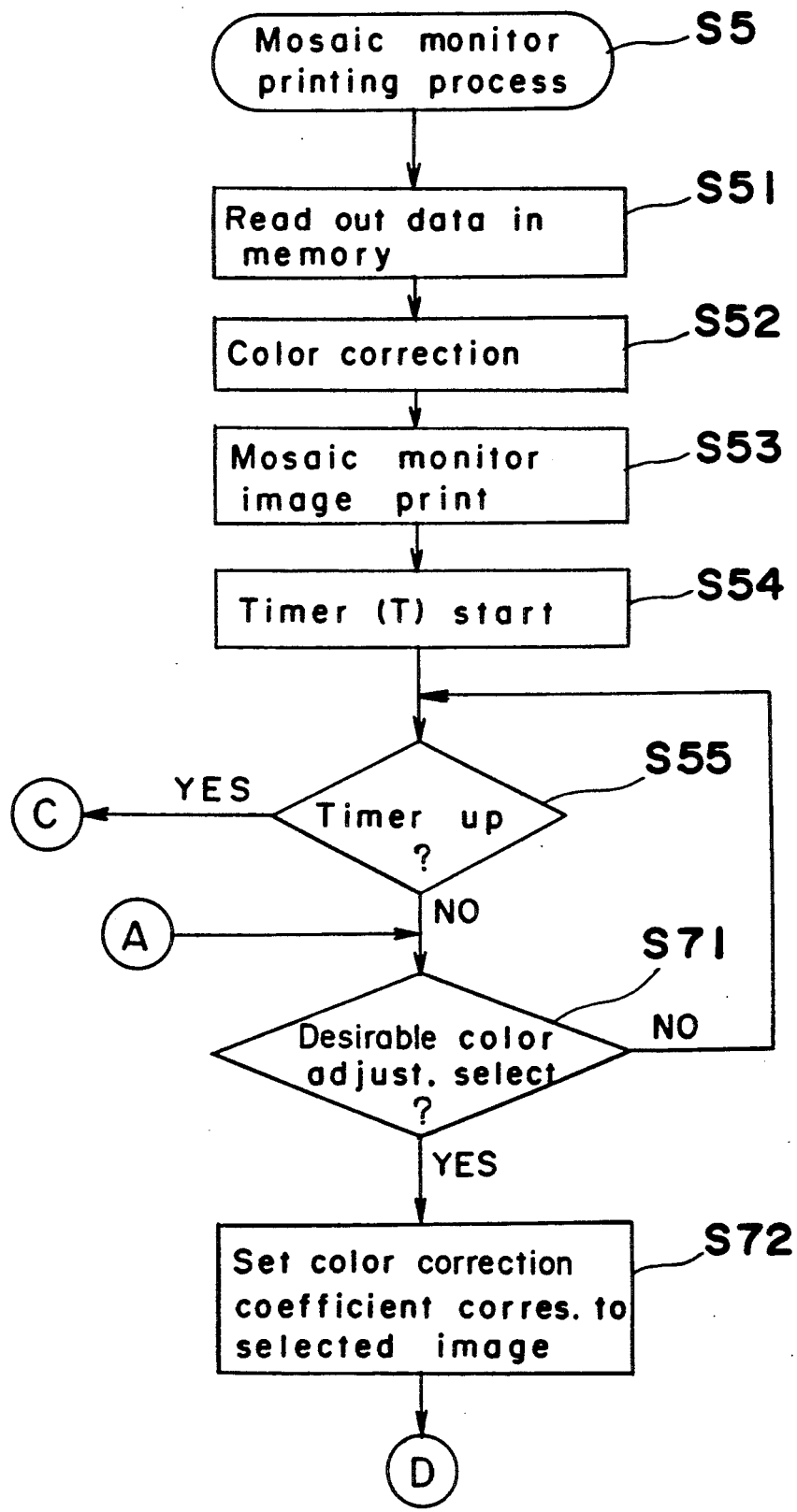
FIGS. 14a and 14b are flow charts of a mosaic monitor image printing process shown in FIG. 10.
Figure 14B:
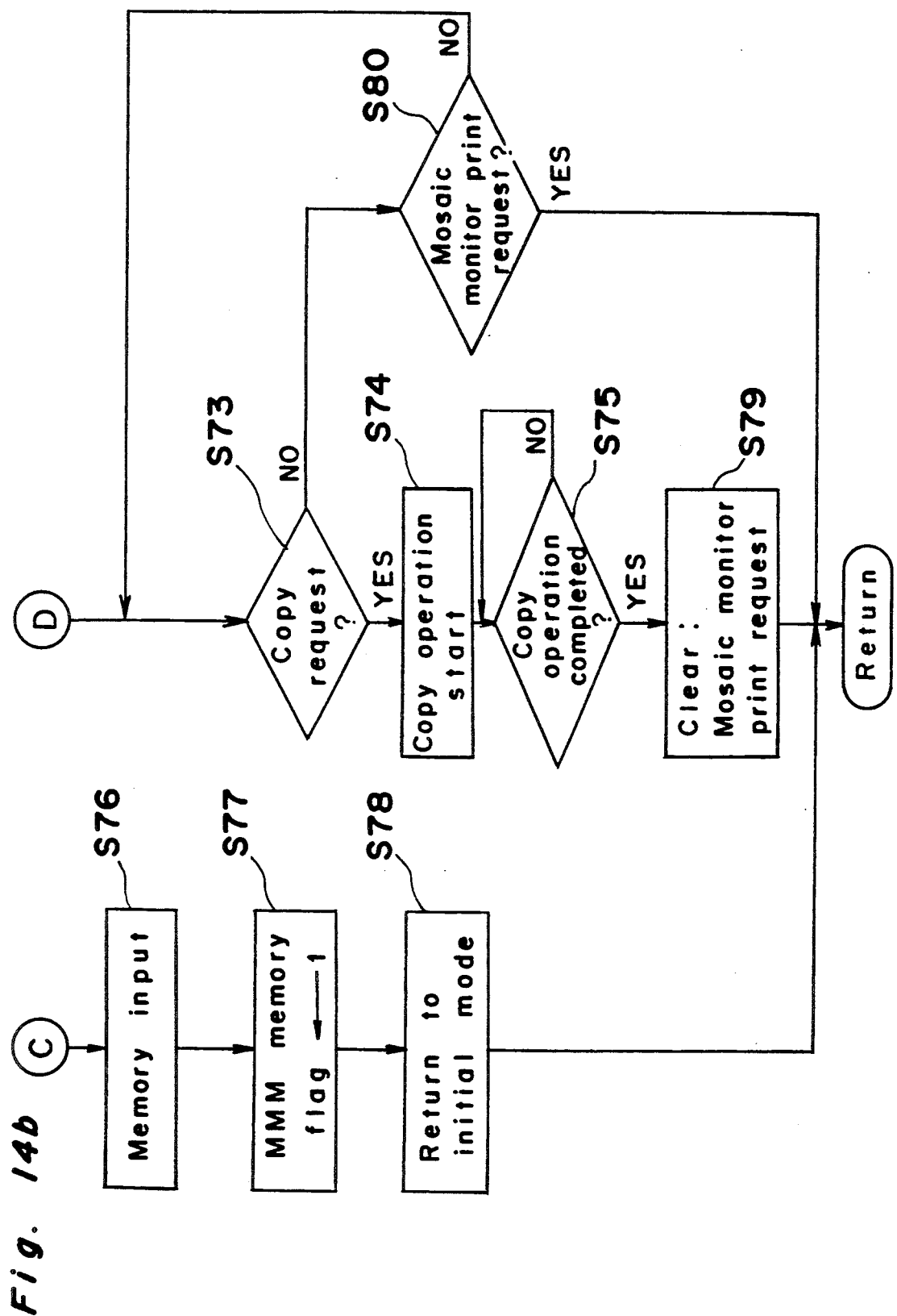

FIGS. 14a and 14b are flow charts of the mosaic monitor image printing process (step S5 of FIG. 10).

Referring to FIG. 14a, first of all, the image data stored in the specified area of the RAM 401 is read out at step S51, and then, the color adjustment coefficients $y_i$, $m_i$ and $c_i$ are outputted to the color tone setting circuit 2 so that the color adjustment is made for the image data by the color tone setting circuit 2 at step S52, and the mosaic monitor image is printed on the copying paper at step S53. Thereafter, the timer (T) 40 is started to count the value at step S54. In the present preferred embodiment, when the timer (T) 40 counts a time of one minute, the timer (T) 40 outputs the time up signal to the CPU 25.

Thereafter, it is judged at step S55 whether or not the timer (T) 40 counts the time of one minute, namely, the CPU 25 receives the time up signal. When the time up signal is not received by the CPU 25 (No at step S55), it is judged whether or not the operator selects a desirable image (block image) from the mosaic monitor image at step S71. When a desirable image is selected, the color adjustment coefficients Ky, Km and Kc are set depending on the selected image at step S72 as described in the above paragraph (b) of the present preferred embodiment.

Thereafter, it is judged whether or not the print start key 71 is pressed so as to request the copying operation at step S73. When the print start key 71 is pressed, the document starts to be scanned, and the copying operation is started with making the color adjustment for the image data under the condition of the color adjustment coefficients yi, mi and ci at step S74. Thereafter, the copying operation is performed until the copying operation is completed at step S75, and the request of the mosaic monitor printing process is cleared at step S79, the program flow returns.

Furthermore, when the print start key 71 is not pressed (No at step S73) and the mosaic monitor selecting key 78 is pressed (Yes at step S80), the program flow returns to the main routine and the mosaic monitor printing process is performed again. In the color adjustment of this mosaic monitor printing process, standard coefficients $c_1$, $m_1$ and $y_1$ are respectively set at the color adjustment coefficients Ky, Km and Kc which are selected at step S71, and the color adjustment coefficients are altered by using the adjustment value $a_0$ as follows:

$y_0 \leftarrow y_1 - a_0$ $y_2 \leftarrow y_1 + a_0$ $m_0 \leftarrow m_1 - a_0$ $m_2 \leftarrow m_1 + a_0$ $c_0 \leftarrow c_1 - a_0$ $c_2 \leftarrow c_1 + a_0$ On the other hand, when the time of one minute has passed without selecting the mosaic monitor image (Yes at step S55), the mode data regarding the mode of the digital color copying machine which is set at present is stored in the mode memory 36 at step S76. The mode data to be stored in the mode memory 36 are as follows:
 (a) The size of the copying paper—A3
 (b) The magnification—equal magnification
 (c) The number of copies—one copy
 (d) The selecting state of the mosaic monitor mode—selected
 (e) The density level—standard value
 (f) The color adjustment standard levels—5, 5 and 5
 (g) The color mode—full color mode The above color adjustment levels are respectively set at, for example, integer values in the range from one to nine corresponding to the color adjustment coefficients of respective colors. For example, if the color adjustment standard coefficients $c_1$, $m_1$ and $y_1$ are 5, 5 and 5, respectively, the coefficients $c_0$, $m_0$ and $y_0$ become 4, 4 and 4, respectively. The color adjustment standard levels to be stored are standard coefficients $c_1$, $m_1$ and $y_1$ upon printing the mosaic monitor image on the copying paper. In the initial setting process, respective color adjustment standard levels are set at 5, 5 and 5. However, as shown in the process of step S80, in the second or more time process of the mosaic monitor mode, the color adjustment levels which are applied to the selected image are stored as the color adjustment standard levels, respectively. Furthermore, the color adjustment levels can be altered by operating the function keys 78 to 81 of the operation panel 70.

Thereafter, the mosaic monitor mode memory flag is set at "1" at step S77 so as to indicate that the mode data are stored in the mode memory 36 or to indicate a waiting state for selection of a desirable image, and then, it is inhibited to newly enter the mosaic monitor mode (See steps S20, S23 and S35 of FIG. 13). Thereafter, the program flow returns to the initial mode at step S78. Namely, the image of the initial mode is displayed on the display section 84 as shown in FIG. 12, and then, the process of the mosaic monitor mode is suspended and the copying operation can be performed.

Furthermore, when the mosaic monitor mode memory read key 81 is pressed (Yes at step S11 of FIG. 11) after the CPU 25 receives the time up signal outputted from the timer (T) 40, the data stored in the mode memory 36 is read out at step S12, the data read out therefrom are displayed on the display section 84 and the mosaic monitor mode memory flag is set at "0" so that it is newly permitted that the mode data is stored in the mode memory 36 temporarily. When the all reset key 74 is not pressed (No at step S15), the program flow goes to step S71, and then, a desirable image can be selected.

On the other hand, in the case that a desirable image is not selected, the all reset key 74 is pressed. Then, the mosaic monitor mode is cleared and the program flow returns to the initial mode.

FIGS. 15a and 15b are flow charts of an interruption process for setting the color adjustment coefficients for making the color adjustment upon printing the mosaic monitor image. This interruption process is performed when the horizontal synchronizing signal Hsync is input to the CPU 25 so that the operation of the CPU 25 is interrupted.

In the interruption process, a counter $C_{t1}$ counts a distance in the subscan direction Y from the edge of the image formed on a copying paper P shown in FIG. 7 so as to detect the print start point $P_0$ and the print end point $P_1$ of the mosaic monitor image GM. A counter $Ct_2$ counts a distance in the subscan direction Y so as to detect respective blocks of images of the mosaic monitor image GM. In FIG. 7, T denotes a distance in the subscan direction Y between the edge of the image and the print start point of the mosaic monitor image GM, and l denotes a distance in the subscan direction Y of one block of the images of the mosaic monitor image.

Referring to FIG. 15a, first of all, the program flow goes to either one of step S301, S311, S341, S351 or S361 according to a state number at step S300. It is to be noted that the state number is set at "0" at the beginning of the print operation of the mosaic monitor image.

If the state number is "0" at step S300, it is judged whether or not the scanning point of the document has passed through the edge of the image formed on the copying paper P at step S301. When the scanning point has passed through the edge of the image (Yes at step S301), the counting value of the counter $Ct_1$ is initialized at step S302, and the state number is set at "1" at step S303. Thereafter, the program flow goes to step S371. On the other hand, when the scanning point has not passed through the edge of the image (No at step S301), the program flow goes to step S371, directly.

If the state number is "1" at step S300, it is judged whether or not the counting value of the counter $Ct_1$ is equal to a value T at step S311, i.e., the scanning point reaches the position of the coordinate $y_0$ which is the edge of the mosaic monitor image GM. When the counting value of the counter $Ct_1$ is equal to the value T (Yes at step S311), the program flow goes to either one of steps S313, S322 or S331 according to the color of toner supplied by the development units 45a to 45c. That is, when the color of toner is yellow (Yes at step S312), the state number is set at "2" at step S313. When the color of toner is magenta (Yes at step S321), the counting value of the counter $Ct_2$ is initialized at step S322, the variable i is set at "0" at step S323, and then, the state number is set at "3" at step S324. On the other hand, when the counting value of the counter $Ct_1$ is not equal to the value T (No at step S311), the program flow goes to step S371, directly. When the color of toner is cyan (No at step S321), the counting value of the counter $Ct_2$ is initialized at step S331, the variable j is set at "0" at step S332, and the state number is set at "4" at step S333.

If the state number is "2" at step S300, a latch signal is outputted to the color tone setting circuit 2 at step S341 so that the values $y_0$, $y_1$ and $y_2$ are latched as the coefficients 1 to 3 at the latches 302, 303 and 304, respectively, and thereafter, it is judged whether or not the counting value of the counter $Ct_1$ is equal to a value (T+9 l) at step S342, i.e., the scanning point reaches the position of the coordinate $y_1$ which is the last edge of the mosaic monitor image GM. When the counting value of the counter $Ct_1$ is equal to the value (T+9 l) (Yes at step S342), the state number is set at "0" at step S343, and then, the program flow goes to step S371. On the other hand, when the counting value of the counter $Ct_1$ is not equal to the value T+9 l) (No at step S342), the program flow goes to step S371, directly.

If the state number is "3" at step S300, the value $m_i$ is set as the coefficients 1 to 3 at the latches 302 to 304 at step S351, and it is judged whether or not the counting value of the counter $Ct_2$ is equal to the value l, i.e., the scanning point has passed through one block of image of the mosaic monitor image GM at step S352. If the counting value of the counter $Ct_2$ is equal to the value l (Yes at step S352), the counting value of the counter $Ct_2$ is initialized at step S353, and the variable i is increased by one at step S354. Thereafter, the program flow goes to step S355. On the other hand, if the counting value of the counter $Ct_2$ is not equal to the value l (No at step S352), the program flow goes to step S355, directly. At step S355, it is judged whether or not the counting value of the counter $Ct_1$ is equal to the value (T+9 l), i.e., the scanning point reaches the last edge of the mosaic monitor image. If the counting value of the counter $Ct_1$ is equal to the value (T+9 l) (Yes at step S355), the state number is set at "0" at step S356, and the program flow goes to step S371. On the other hand, if the counting value of the counter $Ct_1$ is not equal to the value (T+9 l) (No at step S355), the program flow goes to step S371, directly. That is, in the process of the state number "3", the same value $m_i$ is set at the coefficients 1 to 3, and also the coefficients 1 to 3 are altered to the new value $m_i+1$ every time the scanning point reaches the next block of image of the mosaic monitor image in the subscan direction Y.

If the state number is "4" at step 300, the value Cj is set as the coefficients 1 to 3 at the latches 302 to 304 at step 361, it is judged whether or not the counting value of the counter $Ct_2$ is equal to a value (3 l), i.e., the scanning point has passed through three blocks of images of the mosaic monitor monitor image at step S362. If the counting value of the counter $Ct_2$ is equal to the value (3 l) (Yes at step S362), the counter $Ct_2$ is initialized at step S363, and the variable j is increased by one at step S364, and thereafter, the program flow goes to step S365. On the other hand, if the counting value of the counter $Ct_2$ is not equal to the value (3 l) (No at step S362), the program flow goes to step S365, directly.

At step S365, it is judged whether or not the counting value of the counter $Ct_1$ is equal to the value (T+9 l), i.e., the scanning point reaches the last edge of the mosaic monitor image at step S365. If the counting value of the counter $Ct_1$ is equal to the value (T+9 l) (Yes at step S365), the state number is set at "0" at step S366, and then, the program flow goes to step S371. On the other hand, if the counting value of the counter $Ct_1$ is not equal to the value (T+9 l) (No at step S365), the program flow goes to step S371, directly. In the above process of the state number "4", the same value Cj is set as the coefficients 1 to 3 at the latches 302 to 304, and the coefficients 1 to 3 are altered to the new value Cj+1 every time the scanning point passes through three blocks of images of the mosaic monitor image in the subscan direction Y.

After respective above processes of the state numbers "1" to "4", respective counting values of the counters $Ct_1$ and $Ct_2$ are increased by one at step S371, and then, the program flow returns. When the above processes are completed, various coefficients are set at respective blocks of images corresponding to respective printing colors so that the color adjustment has been made for the mosaic monitor image.

It is understood that various other modifications will be apparent to and can be readily made by those skilled in the art without departing from the scope and spirit of the present invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which the present invention pertains.

What is claimed is:

1. A digital color copying machine comprising:
   image reading means for scanning an original document image and generating image data;
   color correcting means for making a color correction for said image data with a color tone;
   image forming means for forming the original document image on a recording medium in response to the image data color-corrected by said color correcting means;
   mode selecting means for selecting a test mode;
   area indicating means for indicating a partial area of the original document image;
   memory means for storing a collection of the image data corresponding to the partial area indicated by said area indicating means;
   test image signal generating means for reading out said collecting of the image data stored in said memory means and applying it to said color correcting means repeatedly and respectively making the color correction with different color tones for plural collections of the image data applied repeatedly, thereby generating plural a test image signal when the test mode is selected by said mode selecting means;
   first control means for controlling said image forming means according to the test image signal generating by said test image signal generating means and forming plural test images of the indicated partial area for which the color correction is made with different color tones respectively on a recording medium;
   image selecting means for selecting any one of the plural test images formed by said first control means;
   second control means for controlling said color correcting means so as to make the color correction for the entire original document image with a color tone with which the color correction has been made for the one of the plural test images selected by said image selecting means, and producing a copy of the entire original document image; and
   canceling means for canceling the test mode selected by said mode selecting means if one of the plural test images has not been selected by said image selecting means during a predetermined time period after plural test images are formed by said first control means.

2. The digital color copying machine as claimed in claim 1, wherein said canceling means comprises a timer for counting the predetermined time period.

3. The digital color copying machine as claimed in claim 1, wherein said color correcting means comprises calculation means for making a predetermined calculation for the image data generated by said image reading means to generate color-corrected image data.

4. The digital color copying machine as claimed in claim 3, wherein said calculation means is a multiplier for multiplying the image data by a coefficient related to a color tone.

5. The digital color copying machine as claimed in claim 1, wherein said color correcting means comprises color masking means for converting the image data generated by said image reading means into an image signal corresponding to a printing color and color adjusting means for making a color adjustment with a color tone for the image signal converted by said color masking means.

6. The digital color copying machine as claimed in claim 5, wherein said color adjusting means comprises multiplying means for multiplying the image signal converted by said masking means by a coefficient related to color tone to generate the color-corrected image data.

7. The digital color copying machine as claimed in claim 1, wherein said first control means forms plural test images of the indicated partial area for which the color correction is made with different color tones on a matrix on the same one recording medium.

8. A digital color copying machine comprising:
   image reading means for scanning an original document image and generating image data;
   color adjusting means for adjusting a color tone of the image data generated by said image reading means;
   image forming means for forming the original document image on a recording medium in response to the image data generated by said image reading means and adjusted by said color adjusting means;
   mode selecting means for selecting a test mode;
   test image forming means for making plural color adjustments with different color tones for a partial specific area of the original document image respectively by said color adjusting means when the test mode is selected by the mode selecting means thereby forming plural test images at different positions on a recording medium, each test image having a different color tone,
   image selecting means for selecting any one of the plural test images formed by said test image forming means;
   means for controlling said color adjusting means so as to make the color adjustment for the entire original document image with a color tone with which the color adjustment has been made for the one of said test images selected by said image selecting means, and controlling said image forming means so as to produce a copy of the entire original document image with the color tone with the color adjustment has been made for the one of said test images selected by said image selecting means; and
   canceling means for canceling the test mode selected by said mode selecting means if one of the plural test images has not been selected by said image selecting means during a predetermined time period after the plural test images are formed by said test image forming means.

9. The digital color copying machine as claimed in claim 8, wherein said color adjusting means comprises multiplying means for multiplying the image data generated by the image reading means by a coefficient related to a color tone to generate the color-adjusted image data.

10. The digital color copying machine as claimed in claim 9, wherein said test image forming means forms plural test images for which the color adjustment is made with different color tones on a matrix on the same one recording medium.

11. An image recording apparatus for forming an image on a recording medium in accordance with image data which comprises:
    mode selecting means for selecting a test mode;
    color adjusting means for making different color adjustments for he image data so as to generate plural image data color-adjusted with different color tones when the test mode is selected by said mode selecting means;

image forming means for forming plural test images respectively having different color tones as different positions of a recording medium in accordance with the color-adjusted image data generated by said adjusting means;

image selecting means for selecting any one of the plural test images formed by said image forming means;

means for controlling said color adjusting means so as to make the color adjustment for the entire original document image with a color tone with which the color adjustment has been made for the one of said test images selected by said selecting means, and producing a copy of the entire original document image with the color tone with which the color adjustment has been made for the one of said test images selected by said image selecting means; and canceling means for canceling the test mode selected by said mode selecting means if one of the plural test images has not been selected by said image selection means during a predetermined time period after the plural test images are formed by said image forming means.

12. The image recording apparatus as claimed in claim 11, wherein said color adjusting means makes a predetermined calculation for the image data so as to make a color adjustment.

13. An image recording apparatus for forming an image on a recording medium in accordance with image data which comprises:

mode selecting means for selecting a test mode;

memory means for storing a collection of image data corresponding to a partial specific part of an entire original document image;

test image signal generating means for reading out said collection of the image data stored in said memory means repeatedly and making a color adjustment with different color tones for said collection of the image data read out repeatedly when the test mode is selected by said mode selecting means, thereby generating a test image signal or test image including plural images having different color tones;

image forming means for forming said test image including plural images having different color tones on the recording medium in accordance with the test image signal generated by said test image signal generating means;

image selecting means for selecting any one of the plural images of said test image formed by said image forming means;

means for making the color adjustment for the entire original document image with a color tone with which the color adjustment has been made for one of said test images selected by said image selecting means, and producing a copy of the entire original document image having the color tone with which the color adjustment has been made for the one of said test images selected by said image selecting means; and canceling means for canceling the test mode selected by said mode selecting means if one of the plural images of said test image has not been selected by said image selecting means during a predetermined time period after the plural images of said test image are formed by said image forming means.

14. The image recording apparatus as claimed in claim 13, wherein said test image signal generating means makes a predetermined calculation for the image data so as to make the color adjustment.

15. An image recording apparatus for forming an image on a recording medium in accordance with image data which comprises:

color adjustment means for making a predetermined calculation with use of predetermined parameters for the image data so as to adjust a color tone thereof;

means for providing image data corresponding to a partial specific part of an entire document image to said color adjusting means repeatedly;

mode selecting means for selecting a test mode;

varying means for automatically varying the parameters of the calculation made by said color adjusting means in synchronization with the operation of said providing means when the test mode is selected by said mode selecting means;

image forming means for forming plural test images corresponding to the partial specific part respectively having different color tones on a recording medium in accordance with the image data color-adjusted by said color adjusting means;

image selecting means for selecting any one of the plural test images formed by said image forming means;

latching means for latching the parameters of the calculation made by said color adjusting means, said latched parameters being used for a following recording operation; and canceling means for canceling the test mode selected by said mode selecting means if one of the plural test images has not been selected by said image selecting means during a predetermined time period after the plural test images are formed by said image forming means.

16. A digital color copying machine comprising:

image reading means for scanning an original document image and generating image data;

color correcting means for making a color correction for said image data generated by said image reading means;

image forming means for forming the original document image on a recording medium in response to the image data color-corrected by said color correcting means;

mode selecting means for selecting a test mode;

area indicating means for indicating any part of the original document image;

memory means for selectively storing image data corresponding to the part indicated by said area indicating means from the image data generated by said image reading means;

test image signal generating means for reading out the image data stored in said memory means and applying it to said color correcting means repeatedly and making the color correction with different color tones for the image data applied repeatedly, thereby generating a test image signal when the test mode is selected by said mode selecting means;

first control means for controlling said image forming means according to the test image signal generated by said test image generating means and forming plural test images on a recording medium;

image selecting means for selecting any one of the plural test images;

second control means for controlling said color correcting means so as to make the color correction for the entire original document image with a color tone with which the color correction has been made for the one of said test images selected by said image selecting means, and controlling said image forming means so as to product a copy of the entire original document image having the color tone with which the color adjustment has been made for the one of said test images selected by said image selecting means;

storing means for storing copying conditions to be used in the test mode and canceling the test mode selected by the mode selecting means so as to defer the selection of one of the plural test images if one of the plural test images has not been selected by said image selecting means during a predetermined time period after the plural test images are formed by said first control means; and restoring means for restoring said copying conditions stored by said storing means so as to enable said image selecting means to select any one of the plural test images.

17. The digital color copying machine as claimed in claim 16, wherein said restoring means comprises key input means which is manually operable for instructing to restore said copying conditions.

18. The digital color copying machine as claimed in claim 16, further comprising inhibiting means for inhibiting the selection of said mode selecting means after said storing means has stored said copying conditions.

19. The digital color copying machine as claimed in claim 18, further comprising:
   instruction inputting means for inputting an instruction for clearing said copying conditions stored by said storing means; and
   clearing means for clearing said copying conditions stored by said storing means when the instruction is input by said instruction inputting means.

20. An image recording apparatus for forming an image on a recording medium in accordance with image data which comprises:
   mode selecting means for selecting a test mode;
   color adjusting means for making a color adjustment with different color tones for the image data so as to generate plural color-adjusted image data respectively having different color tones when the test mode is selected by said mode selecting means;
   image forming means for forming the plural test images respectively having different color tones at different positions of a recording medium in accordance with plural color-adjusted image data generated by said color adjusting means;
   image selecting means for selecting any one of the plural test images formed on the recording medium;
   means for controlling said color adjusting means so as to make the color adjustment for the entire original document image with a color tone with which the color adjustment has been made for one of said test images selected by said image selecting means, and controlling said image forming means so as to produce a copy of the entire original document image with the color tone with which the color adjustment has been made for the one of said test images selected by said image selecting means;
   storing means for storing copying conditions to be used in the test mode and canceling the test mode selected by said mode selecting means so as to defer the selection of one of the plural test images if one of the plural test images has not been selected by said image selecting means during a predetermined time period after the plural test images are formed by said image forming means; and
   restoring means for restoring said copying conditions stored by said storing means so as to enable said image selecting means to select any one of the plural test images.

21. The digital color copying machine as claimed in claim 20, wherein said restoring means comprises key input means which is manually operable for instructing to restore said copying conditions.

22. The digital color copying machine as claimed in claim 20, further comprising inhibiting means for inhibiting the selection of said mode selecting means after said storing means has stored said copying conditions.

23. The digital color copying machine as claimed in claim 22, further comprising:
   instruction inputting means for inputting an instruction for clearing said copying conditions stored by said storing means; and
   clearing means for clearing said copying conditions stored by said storing means when the instruction is input by said instruction inputting means.

24. An image recording apparatus for forming an image on a recording medium in accordance with image data which comprises:
   mode selecting means for selecting a test mode;
   memory means for storing image data corresponding to a partial specific part of an entire image;
   test image signal generating means for reading out the image data stored in said memory means repeatedly and making a color adjustment with different color tones for the image data read out repeatedly when the test mode is selected by said mode selecting means, thereby generating a test image signal of plural test images respectively having different color tones;
   image forming means for forming plural test images on a recording medium;
   image selecting means for selecting any one of the plural test images formed on said recording medium;
   means for making the color adjustment for the entire original document image with a color tone with which the color adjustment has been made for one of said test images selected by said image selecting means, and controlling said image forming means so as to produce a copy of the entire original document image with the color tone with which the color adjustment has been made for the one of said test images selected by said image selecting means;
   storing means for storing copying conditions to be used in the test mode and canceling the test mode selected by the mode selecting means so as to defer the selection of one of the plural test images if one of the plural test images has not been selected by said image selecting means during a predetermined time period after the plural test images are formed by said image forming means; and
   restoring means for restoring said copying conditions stored by said storing means so as to enable said image selecting means to select any one of the plural test images.

25. The image recording apparatus as claimed in claim 24, wherein said restoring means comprises key input means which is manually operable for instructing to restore said copying conditions.

26. The image recording apparatus as claimed in claim 25, further comprising inhibiting means for inhibiting the selection of said mode selecting means after said storing means has stored said copying conditions.

27. The digital color copying machine as claimed in claim 26, further comprising:
- instruction inputting means for inputting an instruction for clearing said copying conditions stored by said storing means; and
- clearing means for clearing said copying conditions stored by said storing means when the instruction is input by said instruction inputting means.

28. An image recording apparatus for forming an image on a recording medium in accordance with image data which comprises:
- color adjusting means for making a predetermined calculation with use of parameters for the image data so as to make a color adjustment;
- means for providing image data corresponding to a partial specific part of an entire document image to said color adjusting means repeatedly;
- mode selecting means for selecting a test mode;
- varying means for automatically varying the parameters of the calculation of said color adjusting means in synchronization with the operation of said providing means when the test mode is selected by said mode selecting means;
- image forming means for forming plural test images corresponding to the partial specific part respectively having different color tones on a recording medium in accordance with the image data color-adjusted by said color adjusting means;
- image selecting means for selecting any one of the plural test images formed by said image forming means;
- latching means for latching the parameters of the calculation made by said color adjusting means, said latched parameters being used for a following recording operation;
- storing means for storing copying conditions including said parameters to be used in the test mode and canceling the test mode selected by said mode selecting means so as to defer the selection of one of the plural test images if one of the plural test images has not been selected by said image selecting means during a predetermined time period after the plural test images are formed by said image forming means; and
- restoring means for restoring said copying conditions stored by said storing means so as to enable said image selecting means to select only one of the plural test images.

29. The image recording apparatus as claimed in claim 28, wherein said restoring means comprises key input means which is manually operable for instructing to restore said copying conditions.

30. The image recording apparatus as claimed in claim 29, further comprising inhibiting means for inhibiting the selection of said mode selecting means after said storing means has stored said copying conditions.

31. The digital color copying machine as claimed in claim 30, further comprising:
- instruction inputting means for inputting an instruction for clearing said copying conditions stored by said storing means; and
- clearing means for clearing said copying conditions stored by said storing means when the instruction is input by said instruction inputting means.

* * * * *